United States Patent
Park

(10) Patent No.: US 10,128,986 B2
(45) Date of Patent: Nov. 13, 2018

(54) METHOD AND APPARATUS FOR CONTROLLING SOFT BUFFER FOR TDD-FDD CARRIER AGGREGATION

(71) Applicant: Jungkil Nam, Seongnam-si, Gyeonggi-do (KR)

(72) Inventor: Dong Hyun Park, Seoul (KR)

(73) Assignee: Jungkil Nam, Seongnam-si (KR)

( * ) Notice: Subject to any disclaimer, the term of this patent is extended or adjusted under 35 U.S.C. 154(b) by 0 days.

(21) Appl. No.: 14/582,888

(22) Filed: Dec. 24, 2014

(65) Prior Publication Data

US 2015/0181590 A1 Jun. 25, 2015

(30) Foreign Application Priority Data

Dec. 24, 2013 (KR) .................... 10-2013-0162327

(51) Int. Cl.
*H04L 1/18* (2006.01)
*H04L 5/00* (2006.01)
*H04L 5/14* (2006.01)

(52) U.S. Cl.
CPC .......... *H04L 1/1812* (2013.01); *H04L 1/1822* (2013.01); *H04L 5/0055* (2013.01); *H04L 5/001* (2013.01); *H04L 5/1469* (2013.01)

(58) Field of Classification Search
CPC .... H04W 72/0413; H04L 1/8121; H04L 1/18; H04L 1/1812; H04L 1/1822; H04L 5/001; H04L 5/0055; H04L 5/1469
See application file for complete search history.

(56) References Cited

U.S. PATENT DOCUMENTS

2011/0310820 A1 12/2011 Liao
2013/0070652 A1* 3/2013 Li .................... H04L 1/1822
370/329

(Continued)

FOREIGN PATENT DOCUMENTS

WO WO 2012/060842 A1 5/2012

OTHER PUBLICATIONS

"Issues on DL HARQ process in case of TDD CA with different UL-DL configurations", R1-124313, 3GPP TSG RAN WG1 #70bis, Oct. 8-12, 2012, pp. 1-5, LG Electronics, San Diego, USA.

(Continued)

*Primary Examiner* — Feben Haile
(74) *Attorney, Agent, or Firm* — Paratus Law Group, PLLC

(57) ABSTRACT

Provided is a method and apparatus for controlling soft buffer for TDD-FDD carrier aggregation. The method includes: establishing a Radio Resource Control (RRC) connection with a base station through a first serving cell, the first serving cell supporting a Time Division Duplex (TDD) mode; receiving an RRC message from the base station through the first serving cell, the RRC message comprising carrier aggregation (CA) configuration information, the CA configuration information comprising information of a second serving cell supporting a Frequency Division Duplex (FDD) mode; determining a maximum number of DL HARQ processes for the second serving cell, the maximum number of DL HARQ processes for the second serving cell being differently determined according to a DL reference timing; and storing soft channel bits for a received transport block (TB) based on the determined maximum number of DL HARQ processes for the second serving cell.

10 Claims, 18 Drawing Sheets

| Case 1:FDD(Pcell)-TDD(Scell) CA with self-scheduling |||| Case 2:TDD(Pcell)-FDD(Scell) CA with self-scheduling |||||||
|---|---|---|---|---|---|---|---|---|---|
| | | | $M_{DL\_HARQ}$ || | | $M_{DL\_HARQ}$ (with new timing) || $M_{DL\_HARQ}$ (with Ref. timing) ||
| Pcell | Scell | Pcell | Scell || Pcell | Scell | Pcell | Scell | Pcell | Scell |
| | | | alt 1 | alt 2 | | | alt 1 | alt 2 | alt 1 | alt 2 |
| FDD | TDD #0 | 8 | 8 | 4 | TDD #0 | FDD | 4 | 14 | 14 | 4 | 10 | 10 |
| FDD | TDD #1 | 8 | 8 | 5 | TDD #1 | FDD | 7 | 11 | 11 | 7 | 10 | 10 |
| FDD | TDD #2 | 8 | 8 | 6 | TDD #2 | FDD | 10 | 12 | 12 | 10 | 10 | 10 |
| FDD | TDD #3 | 8 | 8 | 5 | TDD #3 | FDD | 9 | 15 | 15 | 9 | 12 | 12 |
| FDD | TDD #4 | 8 | 8 | 6 | TDD #4 | FDD | 12 | 16 | 16 | 12 | 12 | 12 |
| FDD | TDD #5 | 8 | 8 | 7 | TDD #5 | FDD | 15 | 17(16) | 17(16) | 15 | 15 | 15 |
| FDD | TDD #6 | 8 | 8 | 4 | TDD #6 | FDD | 6 | 14 | 14 | 6 | 10 | 10 |

(56) References Cited

U.S. PATENT DOCUMENTS

| | | | | |
|---|---|---|---|---|
| 2014/0185495 A1* | 7/2014 | Kuchibhotla | ....... | H04W 76/023 370/281 |
| 2014/0293893 A1* | 10/2014 | Papasakellariou | .... | H04W 72/04 370/329 |
| 2015/0023229 A1* | 1/2015 | Yin | ....................... | H04L 5/0032 370/280 |
| 2015/0085718 A1* | 3/2015 | Chen | .................... | H04B 7/2656 370/280 |
| 2015/0085782 A1* | 3/2015 | Seo | ....................... | H04L 1/1861 370/329 |
| 2015/0173102 A1* | 6/2015 | Ruiz Delgado | ....... | H04L 1/1864 370/280 |

OTHER PUBLICATIONS

"Soft buffer management for eIMTA", R1-134603, 3GPP TSG RAN WG1 #74bis, Oct. 7-11, 2013, pp. 1-3, Qualcomm Inc., Guangzhou, China.
"Soft buffer management for eIMTA", R1-135294, 3GPP TSG RAN WG1 #75, Nov. 11-15, 2013, pp. 1-3, Qualcomm Inc., San Francisco, USA.
International Search Report in International Patent Application No. PCT/KR2014/012733, dated Mar. 17, 2015, pp. 1-3.
Written Opinion in International Patent Application No. PCT/KR2014/012733, dated Mar. 17, 2015, pp. 1-5.
3GPP. "3rd Generation Partnership Project; Technical Specification Group Radio Access Network; Evolved Universal Terrestrial Radio Access (E-UTRA); Physical layer procedures (Release 11)," 3GPP TS 36.213 V11.4.0, Sep. 2013.

* cited by examiner

FIG. 6
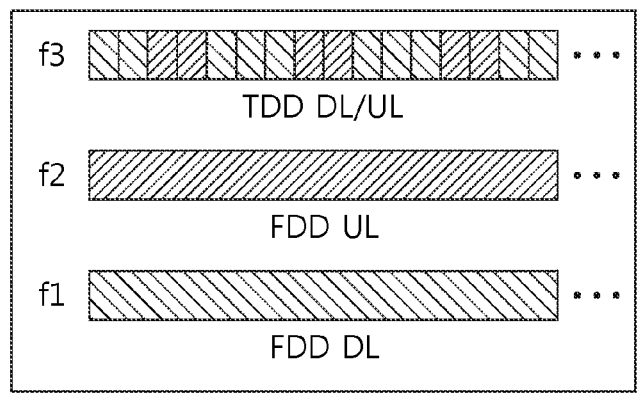
(a) CA of TDD & FDD
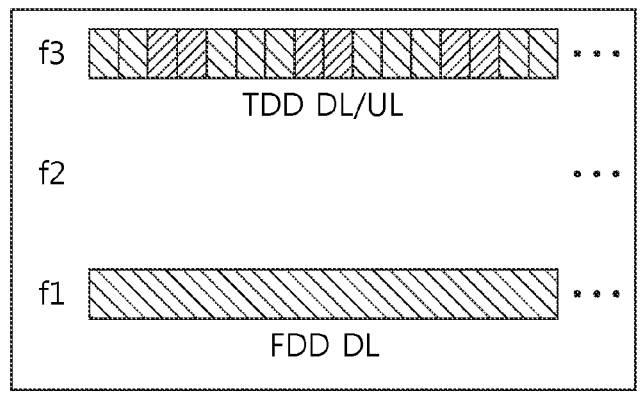
(b) CA of TDD & FDD DL
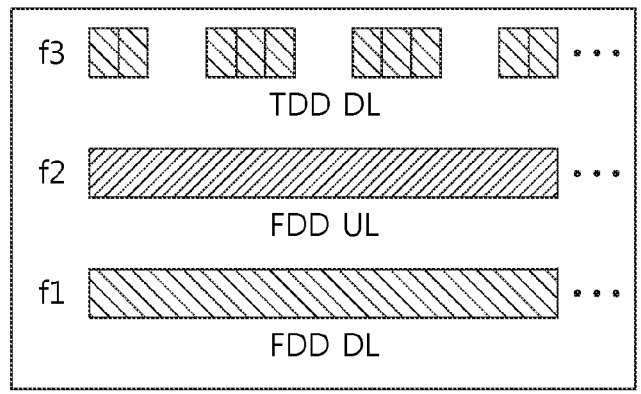
(c) CA of TDD DL & FDD

FIG. 7

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Pcell (FDD) | D | D | D | D | D | D | D | D | D | D | D | D | D | D | D | D | D | D | D | D |
| | U | U | U | U | U | U | U | U | U | U | U | U | U | U | U | U | U | U | U | U |
| | | | | | | | | | | | | | | | | | | | | |
| Scell (TDD#0) | D | S | U | U | U | D | S | U | U | D | D | S | U | U | U | D | S | U | U | D |
| Process# alt 1 | | | | | | #0 | #1 | #2 | #3 | #4 | #5 | #6 | #7 | | | | | | | |
| alt 2 | | | | | | #0 | #1 | #2 | #3 | | | | | | | | | | | |

| No. | $N_{PRB}$ | MCS | Qm | TBS Index | $N_L$ | TBS Information payload size per CC | Scell | $M_{DL\_HARQ}$ Alt 2 | $M_{DL\_HARQ}$ Alt 1 | C | size of systematic bits | UE category | $N_{soft}$ | Kc | $N_{IR}$ Alt 2 | $N_{IR}$ Alt 1 | $N_{cb}$ Alt 2 | $N_{cb}$ Alt 1 | $n_{SB}$ Alt 2 | $n_{SB}$ Alt 1 | G | G' | size of rate matching (E) |
|---|---|---|---|---|---|---|---|---|---|---|---|---|---|---|---|---|---|---|---|---|---|---|---|
| 1 | 50 | 3 | 2 | 3 | 2 | 5736 | TDD 0 | 4 | 8 | 1 | 5760 | 3 | 1237248 | 1 | 309312 | 154656 | 17376 | 17376 | 17376 | 17376 | 30400 | 7600 | 30400 |
| 2 | 50 | 7 | 2 | 7 | 2 | 12216 | TDD 0 | 4 | 8 | 2 | 6132 | 3 | 1237248 | 1 | 309312 | 154656 | 18396 | 18396 | 18396 | 18396 | 30400 | 7600 | 15200 |
| 3 | 50 | 11 | 4 | 10 | 2 | 17568 | TDD 0 | 4 | 8 | 3 | 5880 | 3 | 1237248 | 1 | 309312 | 154656 | 17760 | 17760 | 17760 | 12888 | 60800 | 7600 | 20264 |
| 4 | 50 | 15 | 4 | 14 | 2 | 28336 | TDD 0 | 4 | 8 | 5 | 5692 | 3 | 1237248 | 1 | 309312 | 154656 | 17088 | 17088 | 15465 | 7732 | 60800 | 7600 | 12160 |
| 5 | 50 | 17 | 6 | 15 | 2 | 30576 | TDD 0 | 4 | 8 | 5 | 6140 | 3 | 1237248 | 1 | 309312 | 154656 | 18528 | 18528 | 15465 | 7732 | 91200 | 7600 | 18240 |
| 6 | 50 | 20 | 6 | 18 | 2 | 39232 | TDD 0 | 4 | 8 | 7 | 5629 | 3 | 1237248 | 1 | 309312 | 154656 | 16992 | 16992 | 11046 | 5523 | 91200 | 7600 | 13020 |
| 7 | 50 | 26 | 6 | 24 | 2 | 61664 | TDD 0 | 4 | 8 | 11 | 5630 | 3 | 1237248 | 1 | 309312 | 154656 | 16992 | 14059 | 7029 | 3514 | 91200 | 7600 | 8280 |

FIG. 13

| Case 1:FDD(Pcell)-TDD(Scell) CA with self-scheduling | | | | | Case 2:TDD(Pcell)-FDD(Scell) CA with self-scheduling | | | | | | |
|---|---|---|---|---|---|---|---|---|---|---|---|
| Pcell | Scell | $M_{DL\_HARQ}$ | | | Pcell | Scell | $M_{DL\_HARQ}$ (with new timing) | | | $M_{DL\_HARQ}$ (with Ref. timing) | |
| | | Pcell | Scell | | | | Pcell | Scell | | Pcell | Scell |
| | | | alt 1 | alt 2 | | | | alt 1 | alt 2 | | alt 1 | alt 2 |
| FDD | TDD #0 | 8 | 8 | 4 | TDD #0 | FDD | 4 | 14 | 14 | 4 | 10 | 10 |
| FDD | TDD #1 | 8 | 8 | 5 | TDD #1 | FDD | 7 | 11 | 11 | 7 | 10 | 10 |
| FDD | TDD #2 | 8 | 8 | 6 | TDD #2 | FDD | 10 | 12 | 12 | 10 | 10 | 10 |
| FDD | TDD #3 | 8 | 8 | 5 | TDD #3 | FDD | 9 | 15 | 15 | 9 | 12 | 12 |
| FDD | TDD #4 | 8 | 8 | 6 | TDD #4 | FDD | 12 | 16 | 16 | 12 | 12 | 12 |
| FDD | TDD #5 | 8 | 8 | 7 | TDD #5 | FDD | 15 | 17(16) | 17(16) | 15 | 15 | 15 |
| FDD | TDD #6 | 8 | 8 | 4 | TDD #6 | FDD | 6 | 14 | 14 | 6 | 10 | 10 |

FIG. 14

| Pcell | P-0 | P-1 | | | P-2 | | | P-3 | | | | |
|---|---|---|---|---|---|---|---|---|---|---|---|---|
| Scell | S-0 | S-1 | S-2 | S-3 | S-4 | S-5 | S-6 | S-7 | S-8 | S-9 | S-10 | S-11 | S-12 | S-13 |

FIG. 15

| Pcell | P-0 | P-1 | P-2 | P-3 |
|---|---|---|---|---|
| Scell | S-0 | S-1 | S-2 | S-3 | S-4 | S-5 | S-6 | S-7 | S-8 | S-9 | S-10 | S-11 | S-12 | S-13 |

METHOD AND APPARATUS FOR CONTROLLING SOFT BUFFER FOR TDD-FDD CARRIER AGGREGATION

CROSS-REFERENCE TO RELATED APPLICATION

This application claims priority from and the benefit of Korean Patent Application No. 10-2013-0162327, filed on Dec. 24, 2013, which is hereby incorporated by reference in its entirety.

BACKGROUND

1. Field

The present disclosure relates to a wireless communication, and more particularly, to a method and apparatus for controlling soft buffer for TDD-FDD carrier aggregation.

2. Discussion of the Background

The wireless communication system may support Frequency Division Duplex (FDD) and Time Division Duplex (TDD). In the FDD, a carrier used for an uplink (UL) transmission and a carrier used for a downlink (DL) transmission exist, respectively, and both the UL transmission and the DL transmission are simultaneously executed in a cell. In the TDD, a UL transmission and a DL transmission are distinguished from each other, based on a time, in a single cell. In the TDD, an identical carrier may be used for a UL transmission and a DL transmission Thus, a base station and a UE repeatedly execute conversions between a transmission mode and a reception mode. The TDD includes a special subframe so as to provide a guard time for converting a mode between transmission and reception. The special subframe may include a Downlink Pilot Time Slot (DwPTS), a Guard Period (GP), and an Uplink Pilot Time Slot (UpPTS), as illustrated in the drawings, e.g., FIG. 3. For the TDD, through various UL-DL configurations, resources may be asymmetrically allocated for UL and DL transmissions.

For an effective, reliable communication, a Hybrid Automatic Repeat Request (HARQ) process may be used. Unlike an Automatic Repeat Request (ARQ) process, a Forward Error Correcting Code (FEC) may be used for the HARQ process. For example, if a receiver correctly decodes a data signal (or a packet), the receiver may feedback an acknowledgement (ACK) so as to inform the transmitter that the data signal was correctly decoded. If the receiver fails to correctly decode a data signal, the receiver may feedback a negative acknowledgement to the transmitter to inform the transmitter of the decoding failure of the data signal. A User Equipment (UE) may store a part or entirety of data corresponding to the data signal in a soft buffer of the UE. The UE receives a packet retransmitted from the transmitter, and combines the stored data and the retransmitted data, so as to increase a probability of success of decoding. The UE continuously executes the HARQ process until the packet is correctly decoded or until a predetermined maximum number of retransmissions are executed. Therefore, a space of the soft buffer needs to be reserved for the HARQ process related to a packet that the UE fails to correctly decode. When the soft buffer is fully utilized, or the space is insufficient, the UE may not execute the HARQ process.

Currently, frequency resources are scarce and various technologies are used in a part of the broad frequency bands. For this reason, to satisfy a higher data transmission rate requirement, as a scheme for securing a broadband bandwidth, each scattered band is designed to satisfy basic requirements for operating an independent system and a Carrier Aggregation (CA) has been employed, which binds up a plurality of bands as a single system. A band or a carrier that may independently operate may be defined as a Component Carrier (CC). Further, a TDD-FDD CA supports a CA of an FDD carrier and a TDD carrier. When the TDD-FDD CA system is utilized, it may be required to execute the HARQ processes associated with a plurality of Component Carriers. More specifically, the HARQ processes associated with the TDD and FDD carriers may need to be stored in the soft buffer of the UE. Therefore, when the TDD-FDD CA is configured for the UE, there is a desire for a method of processing or controlling the soft buffer of the UE for the HARQ processes associated with a plurality of CCs.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a method and apparatus for controlling soft buffer for TDD-FDD carrier aggregation.

An exemplary embodiment of the present invention provides a method of performing a Hybrid Automatic Repeat reQuest (HARQ) operation by a user equipment (UE), the method including: establishing a Radio Resource Control (RRC) connection with a base station through a first serving cell, the first serving cell supporting a Time Division Duplex (TDD) mode, and a TDD uplink(UL)-downlink(DL) configuration of the first serving cell being one of 1, 2, 3, 4, and 5; receiving an RRC message from the base station through the first serving cell, the RRC message including carrier aggregation (CA) configuration information, the CA configuration information including information of a second serving cell supporting a Frequency Division Duplex (FDD) mode, and the first serving cell and the second serving cell being aggregated by a TDD-FDD CA scheme; determining a maximum number of DL HARQ processes for the second serving cell, the maximum number of DL HARQ processes for the second serving cell being differently determined according to a DL reference timing; and storing soft channel bits for a received transport block (TB) based on the determined maximum number of DL HARQ processes for the second serving cell.

An exemplary embodiment of the present invention provides a method of performing a Hybrid Automatic Repeat reQuest (HARQ) operation by a user equipment (UE), the method including: establishing a Radio Resource Control (RRC) connection with a base station through a first serving cell, the first serving cell supporting a Time Division Duplex (TDD) mode, and a TDD uplink(UL)-downlink(DL) configuration of the first serving cell being one of 1, 2, 3, 4, and 5; receiving an RRC message from the base station through the first serving cell, the RRC message including carrier aggregation (CA) configuration information, the CA configuration information including information of a second serving cell supporting a Frequency Division Duplex (FDD) mode, and the first serving cell and the second serving cell being aggregated by a TDD-FDD CA scheme; determining a maximum number of DL HARQ processes for the second serving cell according to the TDD UL-DL configuration of the first serving cell, the maximum number of DL HARQ processes for the second serving cell being greater than 8; and storing soft channel bits for a received transport block (TB) based on the determined maximum number of DL HARQ processes for the second serving cell.

BRIEF DESCRIPTION OF THE DRAWINGS

FIG. 6 illustrates examples of capabilities of a UE for a TDD-FDD CA according to an exemplary embodiment of the present invention.

FIG. 7 illustrates examples of the maximum number of DL HARQ processes when a TDD-FDD CA is configured for a UE according to an exemplary embodiment of the present invention.

FIG. 8 illustrates a comparison of a performance of a UE with respect to a single code block, based on an $M_{DL\_HARQ}$ value according to an embodiment of an exemplary embodiment of the present invention.

FIG. 13 illustrates examples of the maximum number of DL HARQ processes according to Case 1 and Case 2.

FIG. 14 illustrates an example of soft buffer allocation according to Method 5-1.

FIG. 15 illustrates an example of soft buffer allocation according to Method 5-2.

DETAILED DESCRIPTION OF THE ILLUSTRATED EMBODIMENTS

Figure 1:
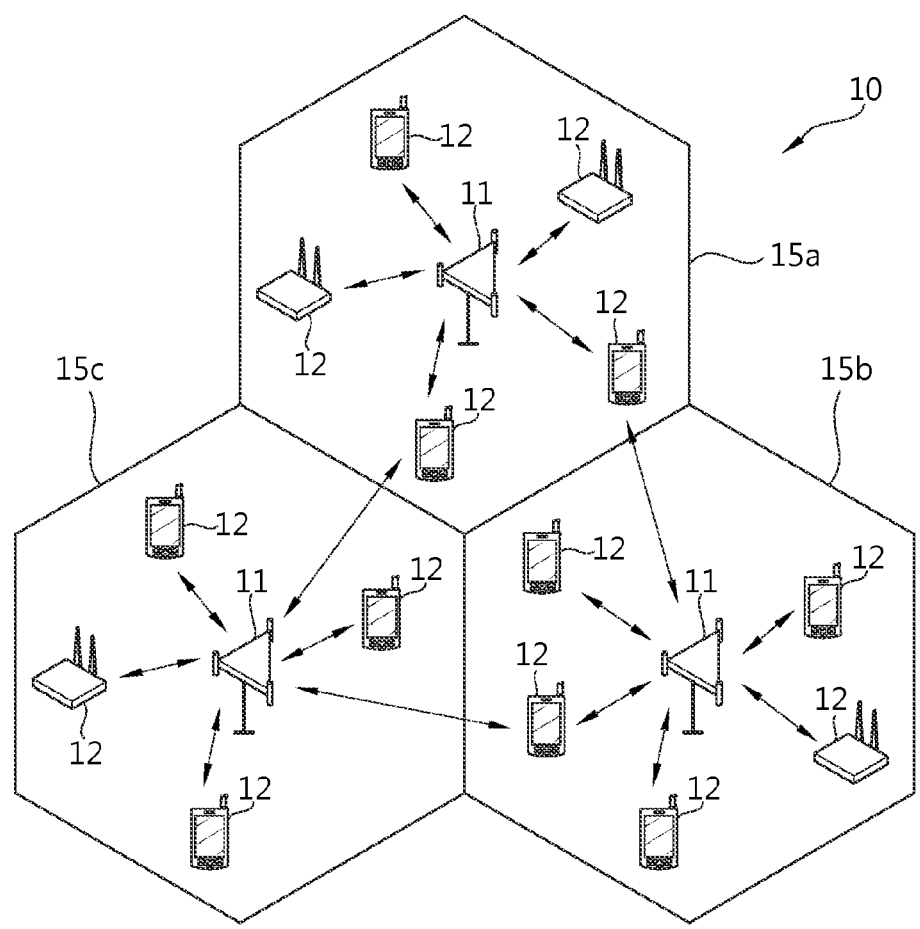
FIG. 1 is a block diagram illustrating a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

Further, the description herein is related to a wireless communication network, and an operation performed in a wireless communication network may be performed in a process of controlling a network and transmitting data by a system that controls a wireless network (e.g., a base station) or may be performed in a user equipment connected to the wireless communication network.

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA may be divided as contiguous carrier aggregation, which is made among continuous CCs, and non-contiguous carrier aggregation, which is made among non-continuous CCs. The number of carriers aggregated between uplink and downlink may be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) may be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) may be aggregated together.

Hereinafter, a multiple carrier system includes the system that supports carrier aggregation. Contiguous CA and/or non-contiguous CA may be used in the multiple carrier system; in addition, both symmetric aggregation and asymmetric aggregation may be used in the multiple carrier system as well. A serving cell may be defined as a component frequency band based on multiple CC system which may be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell may be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to an SCell refers to a DL Secondary Componenent Carrier (SCC), and an uplink component carrier corresponding to an SCell refers to a UL SCC. Only DL CC or UL CC may correspond to a serving cell, or a DL CC and an UL CC together may correspond to a serving cell.

Figure 2:
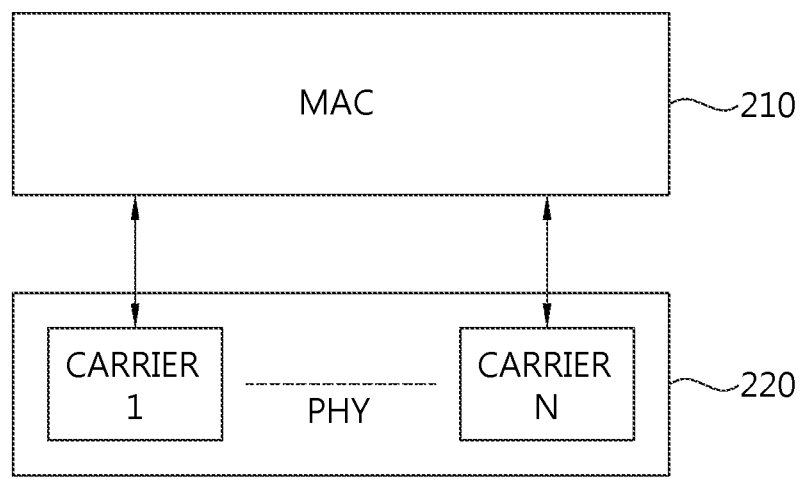
FIG. 2 illustrates an example of a protocol structure for supporting a multi-carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. As a DL physical channel, a Physical Downlink Control Channel (PDCCH) informs to a UE with regard to resource allocation of a Paging Channel (PCH) and a Downlink Shared Channel (DL-SCH), and a Hybrid Automatic Repeat Request (HARM) information related to a DL-SCH. The PDCCH may carry uplink grant which informs a resource allocation of uplink transmission to a UE. The DL-SCHO is mapping to a Physical Downlink Shared Channel (PDSCH). A Physical Control Format Indicator Channel (PCFICH), which transmits every sub-frame, informs the number of OFDM symbols used on the PDCCHs to a user equipment. A Physical Hybrid ARQ Indicator Channel (PHICH), as a DL channel, carries the HARQ ACK/NACK signals as a response to uplink transmission. As a UL physical channel, Physical Uplink Control Channel (PUCCH) may carry UL controlling information such as ACK (Acknowledgement)/NACK (Non-acknowledgement) or Channel Status Information (CSI) which includes Channel Quality Indicator (CQI), Precoding Matrix Index (PMI), Precoding Type Indicator (PTI) or Rank Indication (RI). The Physical Uplink Shared Channel (PUSCH) carries the Uplink Shared Channel (UL-SCH). The Physical Random Access Channel (PRACH) carries random access preamble.

A plurality of the PDCCH may be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
|---|---|
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spartial multiplexing mode. |
| 2A | Used for the PDSCH scheduling of the user equipment configured of large delay CDD mode |
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the tramission of TPC commands for PUCCH and PUSCH including 2-bit power adjustment |
| 3A | Used for the tramission of TPC commands for PUCCH and PUSCH including single-bit power adjustment |
| 4 | Used for the PUSCH scheduling in the uplink multi-antenna port transmission cell |

Referring to Table 1, There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spatial multiplexing mode, format 2B used for the PDSCH scheduling in open-loop spatial multiplexing mode, format 2B used in the transmission mode 8, format 2C used in the transmission mode 9, format 2D used in the transmission mode 10, format 3 and 3A used for the uplink transmission of TPC commands for the PUCCH and the PUSCH, and format 4 used for the the PUSCH scheduling in the uplink multi-antenna port transmission cell.

Each field of DCI is sequentially mapped to n number of information bits $a_0$ or $a_{n-1}$. For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH may be transmitted through different DL CCs, and the PUSCH may be transmitted through a UL CC other than a UL CC linked to a DL CC on which a PDCCH including a UL grant is transmitted.

During cross-carrier scheduling, a user equipment only receives scheduling information (such as UL grant) through a serving cell (or CC). Hereinafter, a serving cell (or CC) performing cross-carrier scheduling may refer to scheduling cell (or CC), and a serving cell being scheduled by scheduling cell may refer to scheduled cell (or CC). Scheduling cell may refer to ordering cell, and scheduled cell may refer to following serving cell. For example, a scheduled cell may be scheduled by a scheduling cell. Scheduling information for the scheduled cell may be received through the scheduling cell.

As such, in a system supporting the cross-carrier scheduling, a carrier indicator is necessary to report which DL CC/UL CC was used to transmit the PDCCH/EPDCCH which indicates the PDSCH/PUSCH transmission. A field including the carrier indicator is hereinafter called a carrier indication field (CIF). Hereinafter, configuration of CIF may mean that configuration of cross-carrier scheduling.

The aforementioned cross-carrier scheduling may be classified into the DL cross-carrier scheduling and UL cross-carrier scheduling. The DL cross-carrier scheduling implies a case where the CC for transmitting the PDCCH/EPDCCH including resource allocation information for the PDSCH transmission and other information is different from a CC for transmitting the PDSCH. The UL cross-carrier scheduling implies a case where a CC for transmitting the PDCCH/EPDCCH including a UL grant for the PUSCH transmission is different from the DL CC linked to the UL CC for transmitting the PUSCH.

Figure 3:
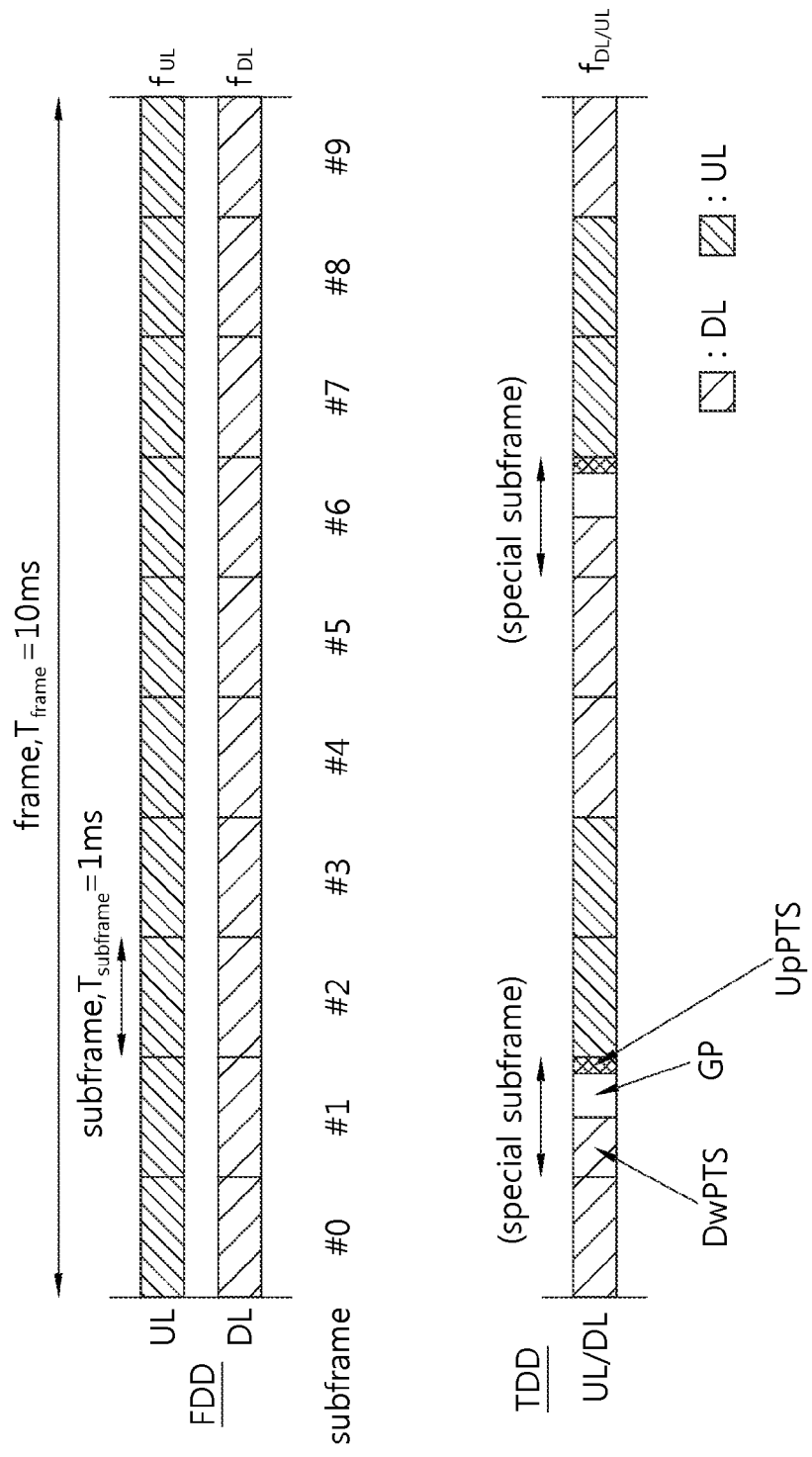
FIG. 3 illustrates an example of a radio frame structure according to an exemplary embodiment of the present invention. This includes an FDD radio frame structure and a TDD radio frame structure.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission may be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe may be placed to provide a guard time which is for switching mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL-DL configuration of radio frame. UL-DL configuration defines reserved subframe for UL transmission or reserved subframe for DL transmission. That is, UL-DL configuration informs the rules how the uplink and the downlink are allocated (or reserved) in every subframe of one radio frame.

TABLE 2

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL-DL transmission may be given asymmetrically. To avoid severe interference between UL and DL among cells, neighboring cells generally have same UL-DL configuration.

The point changing from DL to UL or the point changing from UL to DL is referred to as the switching point. The switch-point periodicity, which is either 5 ms or 10 ms, means a repeating period of the same changing aspect between the UL subframe and DL subframe. For example, referring to the UL-DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 2 may be transmitted from a base station to a user equipment through system information. The base station may inform a UL-DL allocation status change in a radio frame to a UE by transmitting the index of the UL-DL configuration whenever the UL-DL configuration changes. Or the UL-DL configuration may be control information which is transmitted to every UE in the cell through broadcast channel.

Automatic Repeat Request (ARQ) is one of the technologies for increasing reliability of radio communication. According to ARQ, a transmitter retransmits a data signal when a receiver fails to receive the data signal. Also, Hybrid Automatic Repeat Request (HARQ) is a combination of Forward Error Correction (FEC) and ARQ. A receiver that uses an HARQ process basically attempts error correction with respect to a received data signal, and determines whether to execute retransmission using an error detection code. The error detection code may use Cyclic Redundancy Check (CRC). When an error of a data signal is not detected through the CRC detection process, the receiver determines that decoding of the data signal is successful. If the decoding of the data signal is determined to be successful, the receiver transmits an Acknowledgement (ACK) signal to the transmitter. When an error of a data signal is detected through the CRC detection process, the receiver determines that decoding of the data signal is unsuccessful. If the decoding of the data signal is determined to be unsuccessful, the receiver stores a part or the entirety of the received data signal in a soft buffer, and transmits a Non-Acknowledgement (NACK) signal to the transmitter. The transmitter may retransmit a data signal when the NACK signal is received. The receiver receives a packet retransmitted from the transmitter, and combines the stored data signal and the retransmitted data signal, so as to increase a probability of success of decoding. Soft channel bits are allocated to each HARQ process, and the soft channel bits may be stored in the soft buffer. Therefore, a space of the soft buffer needs to be reserved for the HARQ process related to a data signal that a UE fails to correctly decode. When the soft buffer is fully utilized, or the space is insufficient, the UE may not execute the HARQ process, smoothly. Hereinafter, storing a HARQ process in the soft buffer includes storing soft channel bits allocated to the HARQ process in the soft buffer.

First, downlink (DL) HARQ will be described. When a base station transmits, to a UE, a DL grant which is PDSCH scheduling information through a PDCCH/EPDCCH and transmits the PDSCH, the UE transmits, through a PUCCH at a predetermined timing, a HARQ Acknowledgement/Non-acknowledgement (ACK/NACK) with respect to a DL-SCH Transport Block (TB) that is received through the PDSCH. The DL HARQ indicates a process of repeating the above described process in a predetermined period of time, until the base station receives an ACK signal from the UE. According to the current standard, when PUSCH transmission is indicated in an Uplink (UL) subframe that is configured for transmission of other Uplink Control Information (UCI) including an HARQ ACK/NACK signal, the UCI including the HARQ ACK/NACK signal may be transmitted together on the indicated PUSCH under a predetermined rule. Hereinafter, it is described that the HARQ ACK/NACK signal of the DL HARQ is transmitted on a PUCCH, and exemplary embodiments of the present invention include that the HARQ ACK/NACK signal is transmitted on a PUSCH based on whether a PUSCH is transmitted on a corresponding UL subframe.

For the FDD, when the UE detects a PDSCH transmission for the corresponding UE in a subframe n−4, the UE transmits a HARQ response responsive to the PDSCH transmission in a subframe n.

For TDD, when PDSCH transmission indicated by detection of a corresponding PDCCH/EPDCCH exists in a subframe n−k, or when a PDCCH/EPDCCH indicating Semi-Persistent Scheduling (SPS) release exists in the subframe n−k, the UE transmits a HARQ response responsive to the PDCCH/EPDCCH in a subframe n. For TDD or some TDD configured carrier aggregations (CAs), DL HARQ ACK/NACK transmission timings may be listed as shown in Table 3.

TABLE 3

Downlink association set index K: $\{k_0, k_1, \ldots, K_{M-1}\}$ for TDD and some TDD configured CAs

| UL-DL Configurations | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 3, n denotes a subframe number having an index n, and a "DL subframe set" associated with a subframe of the corresponding number is determined by $K=\{k_0, k_1, \ldots, K_{M-1}\}$. n−k denotes an index of a subframe that is located k subframes before the subframe n, and indicates a DL subframe associated with the subframe n. The associated DL subframe indicates a subframe that delivers a PDSCH which is the basis of the determination on an ACK/NACK signal. M denotes the number of elements of a set K defined in table 3, and indicates the number of DL subframes associated with the subframe n.

For example, when UL-DL configuration corresponding to a single serving cell is 1, M of a DL subframe set K associated with a subframe 2 is 2 (M=2), $k_0$=7, and $k_1$=6. Therefore, DL subframes associated with the subframe 2 of the corresponding serving cell are a subframe 5 (2-$k_0$) and a subframe 6 (2-$k_1$) of the previous radio frame because each radio frame has ten subframes from subframe 0 to subframe 9.

Figure 4:
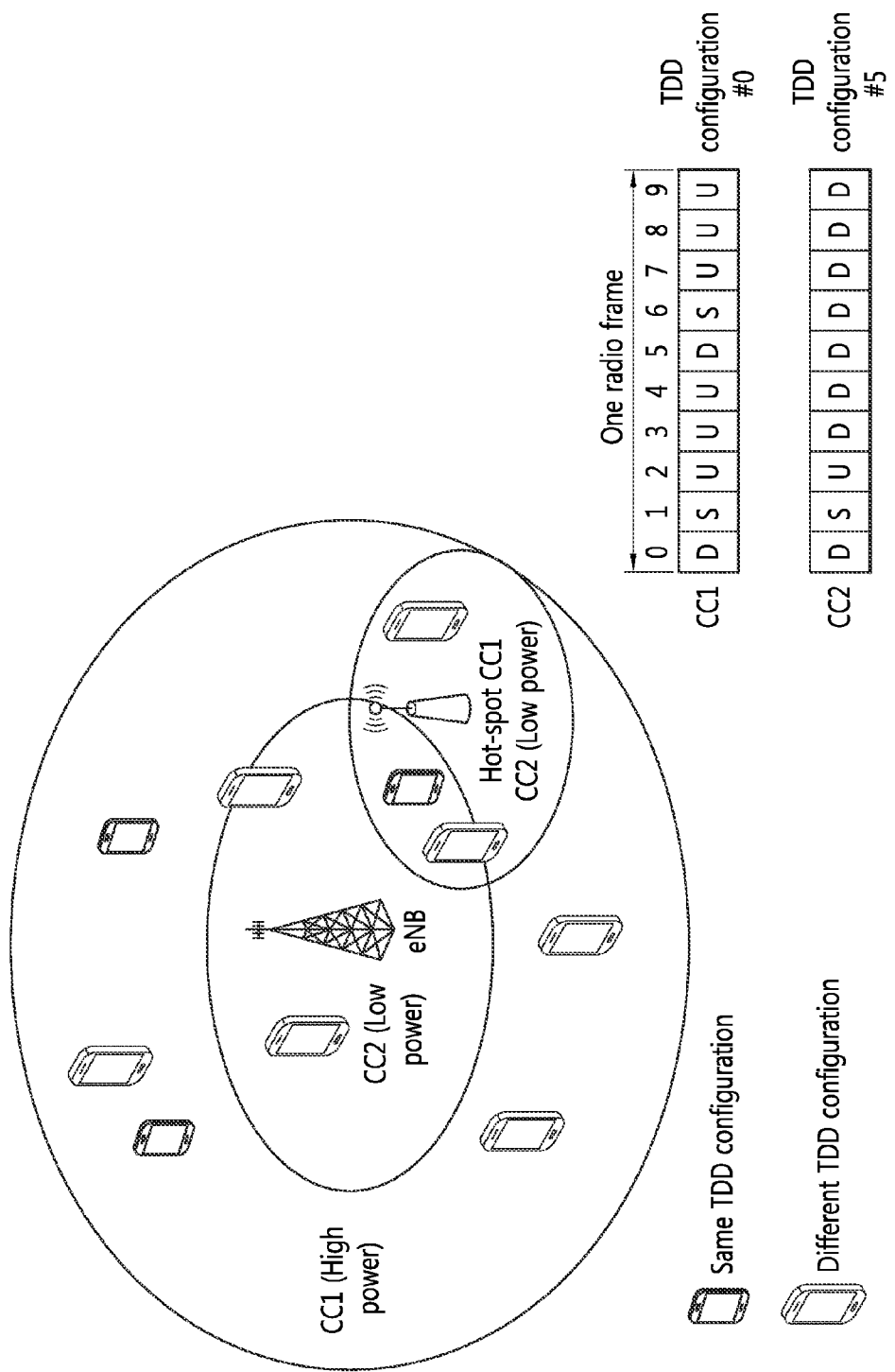
FIG. 4 illustrates a case of an inter-band CA of serving cells having different TDD UL-DL configurations.

FIG. 4 illustrates a case of an inter-band CA of serving cells having different TDD UL-DL configurations.

Referring to FIG. 4, component carriers that configure a CA with a UE are CC1 and CC2, the CC1 may be configured as UL-DL configuration #0 and CC2 may be configured as UL-DL configuration #5, for the purpose of traffic adaption (semi-static) and avoidance of interference between heterogeneous networks. For example, to avoid an interference issue with other TDD systems (for example, TDS-CDMA, WiMAX, and the like) that co-exist in an identical band, different UL-DL configurations may be required in an inter-band CA. In addition, when a UL-DL configuration including a large number of UL subframes is applied to a high frequency band, and a UL-DL configuration including a large number of DL subframes is applied to a low frequency band, it may be helpful for the coverage enhancement.

For the TDD, when a UE is configured with one or more serving cells, at least two serving cells have different UL-DL configurations, and a corresponding serving cell is a Primary Service Cell (PCell), a UL-DL configuration of the corresponding PCell is a DL reference UL-DL configuration for the PCell. Here, the DL reference UL-DL configuration indicates a UL-DL configuration used as a reference for a DL HARQ timing of a corresponding serving cell.

Meanwhile, for the TDD, when a UE is configured with two or more serving cells, at least two serving cells have different UL-DL configurations, and a corresponding serving cell is a Secondary Serving Cell (SCell), a DL reference UL-DL configuration for the corresponding SCell is as shown in the following Table 4.

TABLE 4

| Set # | (Primary cell UL-DL configuration, Secondary cell UL-DL configuration) | DL-reference UL-DL configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

In Table 4, based on a pair of a PCell UL-DL configuration and an SCell UL-DL configuration, the DL reference UL-DL configuration for the SCell may be indicated.

For example, when the pair of the PCell UL-DL configuration and the SCell UL-DL configuration of Table 4 belongs to Set 1, the DL reference UL-DL configuration for the SCell applies a DL HARQ timing based on the DL reference UL-DL configuration for Set 1. In this instance, it is irrespective of a scheduling method.

In a case in which self-scheduling is set for a UE, when the pair of the PCell UL-DL configuration and the SCell UL-DL configuration belongs to Set 2 or Set 3, a DL reference UL-DL configuration of Set 2 or Set 3 may be used. Here, when self-scheduling is set for the UE, it indicates that the UE is not set to monitor a PDCCH/EPDCCH of another serving cell for scheduling of a corresponding serving cell.

In a case in which cross-carrier scheduling is set for a UE, when the pair of the PCell UL-DL configuration and the SCell UL-DL configuration belongs to Set 4 or Set 5, a DL reference UL-DL configuration of Set 4 or Set 5 may be used. Here, when cross-carrier scheduling is set for the UE, it indicates that the UE is set to monitor a PDCCH/EPDCCH of another serving cell for scheduling of a corresponding serving cell.

More specifically, the DL reference UL-DL configuration of Set 1 may be applied when a corresponding pair is satisfied, irrespective of whether a Carrier Indicator Field (CIF) indicating a carrier associated with scheduling is configured. Further, Set 2/Set 3 may be applied to only UEs for which the CIF is not configured, and Set 4/Set 5 may be applied to only UEs for which the CIF is configured.

An ACK/NACK signal with respect to a PDCCH/EPDCCH that indicates a PDSCH or SPS release corresponding to each of a plurality of serving cells of a CA may be transmitted at the above described HARQ timing.

For implementing a system conforming to the $3^{rd}$ Generation Partnership Project (3GPP) Long Term Evolution (LTE) Release (Rel)-11, a method of storing soft channel bits may be used as follows.

When a UE is configured with more than one serving cell, with respect to each serving cell, upon failure of decoding of a code block of a Transport Block (TB), the UE stores received soft channel bits for at least $K_{MIMO} \cdot \min(M_{DL\_HARQ}, M_{limit})$ TBs. The UE may store received soft channel bits corresponding to at least a range of $W_k W_k = 1, \ldots, W_{mod(k+n_{SB}-1, N_{cb})}$. Here, $w_k$ denotes a soft bit index. To determine k, the UE may need to assign a priority for storing soft channel bits corresponding to a lower k value.

In addition, $n_{SB}$ denotes the number of received soft channel bits that the UE stores per code block unit, and may be calculated based on the following Equation 1.

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right) \quad \text{[Equation 1]}$$

Here, C denotes the number of code blocks forming a single TB, $N_{cb}$ denotes a soft buffer size of a code block, and $K_{MIMO}$ is 2 when a UE corresponds to a MIMO Transport Mode (TM), and is 1 for the rest cases. $M_{limit}$ is integer 8, and $N^{DL}_{cells}$ denotes the number of serving cells configured for the UE.

$M_{DL\_HARQ}$ denotes the maximum number of DL HARQ processes, and may be determined based on the following criteria.

For the FDD, a maximum of eight DL HARQ processes exists for each serving cell.

For TDD, when a UE is configured with a single serving cell, or when the UE is configured with one or more serving cells and TDD UL-DL configurations of all of the serving cells are identical, the maximum number of DL HARQ processes for each serving cell may be determined based on the TDD UL-DL configuration, which is as shown in Table 5.

TABLE 5

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

For TDD, when a UE is configured with more than one serving cells and TDD UL-DL configurations of at least two serving cells are different, the maximum number of DL HARQ processes is determined based on the above described Table 5. In this instance, "TDD UL-DL configuration" may refer to a "DL reference UL-DL configuration" determined based on the above described Table 4. For example, when a TDD UL-DL configuration for a serving cell is 6, and a DL reference UL-DL configuration of the serving cell is 1, the number of DL HARQ processes is determined to be 7 based on the configuration index 1, which is the DL reference UL-DL configuration for the corresponding serving cell.

A dedicated broadcast HARQ process is not counted when the maximum number of HARQ processes is calculated, for both the FDD and the TDD.

$N'_{soft}$ in Equation 1 denotes a total number of soft channel bits of a UE. The total number of soft channel bits of the UE is determined based on a UE category. The category of the UE may be indicated by an RRC message. For example, ue-Category field (or ue-Category-v1020 field) of the RRC message may indicate the category of the UE. The ue-Category field (or ue-Category-v1020 field) may be included in a UE-EUTRA-Capability information element of an RRC message.

In particular, ue-Category field includes parameters that define a combined UL and DL capability. The parameters may be determined based on a category of a UE. For example, ue-Category field may include parameter values associated with a DL physical layer, and the parameter values may be listed as shown in Table 6.

TABLE 6

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75378 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3854144 | 2 or 4 |
| Category 8 | 2998560 | 299856 | 35982720 | 8 |

Here, "Total number of soft channel bits" denotes a total number of soft channel bits for storage according to a category of a UE. This may correspond to the above described $N'_{soft}$.

Hereinafter, exemplary embodiments for a TDD-FDD CA (or a TDD-FDD joint operation) that supports a CA of an FDD carrier and a TDD carrier will be described.

Figure 5:
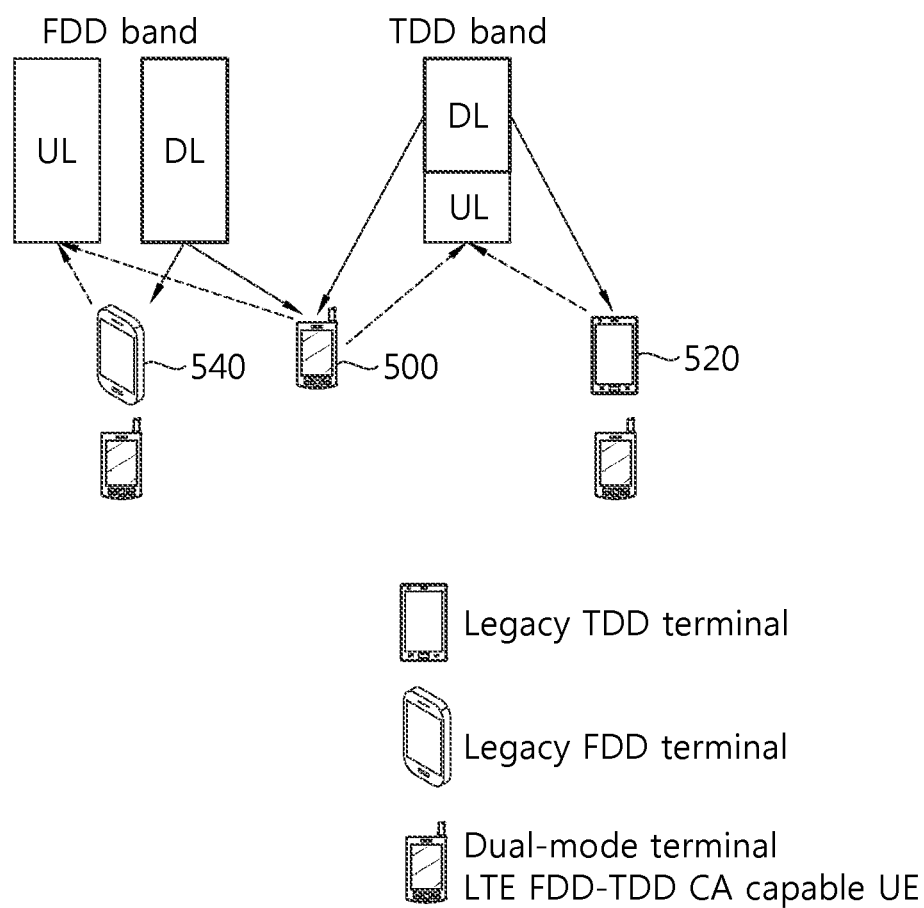
FIG. 5 illustrates an example of an FDD-TDD CA scheme according to an exemplary embodiment of the present invention.

FIG. 5 illustrates an example of an FDD-TDD CA according to an exemplary embodiment of the present invention.

Referring to FIG. 5, a legacy TDD terminal 520 receives a wireless communication service only through a TDD band, and a legacy FDD terminal 540 receives a wireless communication service only through an FDD band. Further, an FDD-TDD CA capable UE 500 receives a wireless communication service through an FDD band and a TDD band, and may also receive a CA-based wireless communication service through a TDD band carrier and an FDD band carrier.

For the above described TDD-FDD CA, for example, the following deployment scenarios may be considered.

For example, an FDD base station and a TDD base station are co-located in an identical place (for example, CA scenarios 1 through 3), or the FDD base station and the FDD base station are not co-located but connected through an ideal backhaul (for example, CA scenario 4).

As another example, the FDD base station and the TDD base station are not co-located and connected through a non-ideal backhaul (for example, small cell scenarios 2a and 2b and a macro-macro scenario).

However, for the TDD-FDD CA, it may be desirable that the TDD base station and the FDD base station are connected through an ideal backhaul, and the TDD cell and the FDD cell are synchronized for operation.

In addition, for the TDD-FDD CA, the following prerequisites may be considered.

First, UEs that support the FDD-TDD CA may access a legacy FDD single mode carrier and a legacy TDD single mode carrier.

Second, legacy FDD terminals and UEs that support the TDD-FDD CA may camp on and be connected to an FDD carrier which is a part of an FDD/TDD network that executes a joint operation.

Third, legacy TDD terminals and UEs that support the TDD-FDD CA may camp on and be connected to a TDD carrier which is a part of the FDD/TDD network that executes a joint operation.

Fourth, network architecture enhancement for facilitating the FDD-TDD CA, for example, with respect to the non-ideal backhaul, may be considered. However, keeping the minimal network architecture changes should be considered since it is essential from the perspective of an operator.

In addition, the following capabilities of a UE may be considered when the UE supports the TDD-FDD CA.

FIG. 6 illustrates examples of capabilities of a UE for a TDD-FDD CA according to an exemplary embodiment of the present invention.

In FIG. 6, an example (a) illustrates that a UE supports a CA of a TDD carrier and an FDD carrier, an example (b) illustrates that a UE supports a CA of a TDD carrier and an FDD DL carrier, and an example (c) illustrates that a UE supports a CA of a DL subframe of a TDD carrier and an FDD carrier.

As mentioned above, a UE may support different types of TDD-FDD joint CAs, and also, may perform simultaneous reception (that is, DL aggregation) in FDD and TDD carriers. Second, a UE may perform simultaneous transmission (that is, UL aggregation) in FDD and TDD carriers. Third, a UE may perform simultaneous transmission and reception (that is, full duplex) in FDD and TDD carriers.

In the above described TDD-FDD CA, the maximum number of aggregated Component Carriers (CCs) may be 5, for example. In addition, an aggregation of different UL-DL configurations for TDD carriers of different bands may be supported.

The FDD-TDD CA capable UE may support a TDD-FDD DL CA and may not support a TDD-FDD UL CA. The FDD-TDD CA capable UE may support at least a TDD-FDD DL CA, but may or may not support a TDD-FDD UL CA.

Further, regardless of whether or not a TDD-FDD UL CA is configured for a UE, transmission of at least one PUCCH (and PUSCH) may be supported on only a PCell (on PCell-only). Further, a transmission of a PUCCH (and PUSCH) may be supported on an SCell, in addition to the PCell.

When a PUCCH is transmitted on only a PCell, the following operations may be executed. First, for a PDSCH/PUSCH transmitted on a PCell, a scheduling/HARQ timing is based on a timing of the PCell, irrespective of whether the PCell is a TDD carrier or an FDD carrier. Second, for a PUSCH transmitted on an SCell based on self-scheduling, a scheduling/HARQ timing is based on a timing of the SCell, irrespective of whether the SCell is a TDD carrier or an FDD carrier. When the PCell is an FDD carrier, and the SCell is a TDD carrier, for a PDSCH transmitted on the SCell based on self-scheduling, a HARQ timing is based on a timing of the PCell.

A UE may configure dual connectivity through two or more base stations among base stations that configure at least one serving cell. The dual connectivity is an operation in which a corresponding UE utilizes radio resources provided by at least two different network points (for example, a macro base station and a small base station) in a radio resource control connection (RRC_CONNECTED) mode. The at least two different network points may be connected through a non-ideal backhaul. Further, one of the at least two different network points may be referred to as a macro base station (or a master base station or an anchor base station), and the remaining base stations may be referred to as small base stations (or secondary base stations, assisting base stations, or slave base stations).

A UE may support a TDD-FDD joint operation when a CA and/or dual connectivity is configured for the UE. Hereinafter, although a case in which a CA is configured for a UE will be described, aspects of the present invention may be applied for a case in which the dual connectivity is configured for the UE.

The UEs conforming to LTE release 11 or older releases detect the maximum number of DL HARQ processes, based on a DL HARQ timing associated with a TDD UL-DL configuration or a DL HARQ timing associated with an FDD, and may store, in a soft buffer, soft channel bits acquired using the maximum number of DL HARQ processes as an input value. More specifically, an existing DL HARQ method only takes into consideration a CA of carriers having an identical TDD UL-DL configuration or different TDD UL-DL configurations, and a CA of FDD carriers, and stores soft channel bits of a UE based on the maximum number of DL HARQ processes. However, when a TDD-FDD CA is configured for a UE, different DL HARQ timings may be applied to different serving cells (a PCell and an SCell), and in this case, the maximum number of DL HARQ processes may be detected for each serving cell. More specifically, the maximum number of DL HARQ processes, which is a main factor that a UE needs to take into consideration when storing soft channel bits in the TDD-FDD CA, may be different for each configured serving cell. Thus, there is desire for a soft channel bits storing method that may be effectively applied to a limited soft buffer of the UE.

The TDD-FDD CA may be classified into four cases, based on a TDD-FDD type and a scheduling mode of a PCell and an SCell, as shown in the following Table 7.

TABLE 7

|  | Type | Scheduling mode |
|---|---|---|
| Case 1 | PCell(TDD)-SCell(FDD) | self scheduling |
| Case 2 | PCell(FDD)-SCell(TDD) | self scheduling |
| Case 3 | PCell(TDD)-SCell(FDD) | Cross-carrier scheduling |
| Case 4 | PCell(FDD)-SCell(TDD) | Cross-carrier scheduling |

The soft channel bits storing methods may be applied to the four cases. For example, one of the channel bits storing methods may be applied to all of the four cases. As another example, one of the methods may be applied to some cases, and another method may be applied to the remaining cases. For example, one of the methods may be applied to Case 1, and another method may be applied to the remaining cases.

The methods provided herein may improve the overall performance for a DL HARQ process of a UE, by applying the methods to 256 QAM, instead of applying to a Modulation Coding Scheme (MCS). Therefore, the soft channel bits storing methods may be applied to a new UE category or UEs that support 256 QAM, in addition to the TDD-FDD CA.

Hereinafter, the soft channel bits storing methods according to exemplary embodiments of the present invention will be described in detail.

Method 1: A Soft Channel Bits Storing Method Based on the Maximum Number of DL HARQ Processes by Taking into Account a DL Subframe that is Available for DL PDSCH Scheduling The maximum number of DL HARQ processes may be calculated based on a TDD UL-DL configuration (or a DL reference UL-DL configuration), as described with reference to Table 5, and soft channel bits may be stored using the above mentioned Equation 1. When such method is applied to a UE for which a TDD-FDD CA is configured, the performance of the UE may be deteriorated. In order to address such problem, the present method provides a soft channel bits storing method that may be applicable to a TDD-FDD CA, by changing the definition of $M_{DL\_HARQ}$ applied to Equation 1.

FIG. 7 illustrates examples of the maximum number of DL HARQ processes when a TDD-FDD CA is configured for a UE according to an exemplary embodiment of the present invention. In FIG. 7, it is assumed that a PCell is an FDD carrier, an SCell is a TDD carrier of TDD UL-DL configuration 0, and a scheduling mode is a self scheduling mode (that is, Case 1 of Table 7).

Referring to FIG. 7, for an SCell, an FDD DL HARQ timing may be applied. Here, alt 1 corresponds to a case that uses an existing method to count the number of DL HARQ processes corresponding to an FDD DL HARQ timing applied to an SCell, and alt 2 corresponds to a case that counts the number of DL HARQ processes by taking into consideration a DL subframe that is available for DL PDSCH scheduling. For alt1 and alt2, $M_{DL\_HARQ}$ may be determined as shown below.

TABLE 8

| | $M_{DL\_HARQ}$ |
|---|---|
| alt 1 | 8(based on FDD HARQ timing) |
| alt 2 | 4(actual DL sub frame for PDSCH transmission) |

A performance gain that a UE may obtain may be compared between cases when $M_{DL\_HARQ}$ of alt 1 is 8 and when $M_{DL\_HARQ}$ of alt 2 is 4, as shown below.

FIG. 8 illustrates a comparison of a performance of a UE with respect to a single code block, based on an $M_{DL\_HARQ}$ value according to an exemplary embodiment of the present invention. FIG. 8 illustrates a difference in performance between alt 1 ($M_{DL\_HARQ}$=8) and alt 2($M_{DL\_HARQ}$=4), based on different Transport Block Sizes (TBSs) (that is, different MCS levels). In FIG. 8, it is assumed that an FDD(PCell)-TDD(SCell) CA and self-scheduling is configured for a UE, $K_{MIMO}$=2, two Cell-specific Reference Signal (CRS) APs are configured, a system bandwidth is 50 PRB (physical resource block)s, and a UE category is 3. An effect on performance of a UE may be analyzed by comparing, between alt 1 and alt 2, an amount of soft channel bits that a UE may store based on each MCS level. $n_{sb}$ denotes the number of soft channel bits that a UE may store for each code block unit, as described above. That is, $n_{sb}$ is a size of soft channel bits that a UE may be allocate (or store) for a single code block.

Referring to FIG. 8, $n_{sb}$ is 17376 for alt 1 and alt 2 when an MCS level is 3. $n_{sb}$ is 18396 for alt 1 and alt 2 when the MCS level is 7. $n_{sb}$ is 12888 for alt 1 and $n_{sb}$ is 17760 for alt 2, when the MCS level is 11. $n_{sb}$ is 7732 for alt 1 and $n_{sb}$ is 15465 for alt 2, when the MCS level is 15. $n_{sb}$ is 7732 for alt 1 and $n_{sb}$ is 15465 for alt 2, when the MCS level is 17. $n_{sb}$ is 5523 for alt 1 and $n_{sb}$ is 11046 for alt 2, when the MCS level is 20. $n_{sb}$ is 3514 for alt 1 and $n_{sb}$ is 7029 for alt 2, when the MCS level is 26. Therefore, generally, alt 2 that has $M_{DL\_HARQ}$ of 4 has a relatively larger amount of soft channel bits than alt 1 that has $M_{DL\_HARQ}$ of 8. A UE may improve error correction capability for a TB where a corresponding code block belongs, through the larger amount of soft channel bits.

In particular, in a case of a high MCS level (for example, 20 or 26), for alt 1, there is a case that $n_{sb}$ is even smaller than a size of systematic bits corresponding to original information. This may have an adverse effect on the error correction capability of the UE. In addition, a smaller information size is stored in a UE and thus, a transmission rate may be deteriorated even in a good channel. In addition, there is a drawback in that an information size that a base station transmits through rate matching for a single code block is not sufficiently stored and thus, the base station may occupy unnecessary resources.

Therefore, when the maximum number of DL HARQ processes is calculated based on a DL subframe that is actually available for DL PDSCH scheduling on an SCell, as illustrated in Method 1 according to an exemplary embodiment of the present invention, the UE may allocate a relatively larger number of soft channel bits per code block and may improve error correction capability.

The maximum number of DL HARQ processes for each TDD UL-DL configuration of the SCell may be listed as below.

TABLE 9

Case 1: FDD(PCell)-TDD(SCell) CA with self-scheduling

| | | | $M_{DL\_HARQ}$ | |
| | | | SCell | |
| PCell | SCell | PCell | alt 1 | alt 2 |
| FDD | TDD UL-DL configuration 0 | 8 | 8 | 4 |
| FDD | TDD UL-DL configuration 1 | 8 | 8 | 5 |
| FDD | TDD UL-DL configuration 2 | 8 | 8 | 6 |
| FDD | TDD UL-DL configuration 3 | 8 | 8 | 5 |
| FDD | TDD UL-DL configuration 4 | 8 | 8 | 6 |
| FDD | TDD UL-DL configuration 5 | 8 | 8 | 7 |
| FDD | TDD UL-DL configuration 6 | 8 | 8 | 4 |

In Table 9, alt 1 corresponds to a case that uses an existing method to count the number of DL HARQ processes corresponding to an FDD DL HARQ timing applied to an SCell when the FDD DL HARQ timing is applied to the SCell, and alt 2 corresponds to a case that counts the number of DL HARQ processes by taking into consideration a DL subframe that is available for DL PDSCH scheduling. In this instance, both the PCell and the SCell to which alt 1 is applied have $M_{DL\_HARQ}$ of 8. However, for a case of the SCell to which alt 2 is applied, $M_{DL\_HARQ}$ is 4 when the TDD UL-DL configuration of the SCell is 0, $M_{DL\_HARQ}$ is 5 when the TDD UL-DL configuration of the SCell is 1, $M_{DL\_HARQ}$ is 6 when the TDD UL-DL configuration of the SCell is 2, $M_{DL\_HARQ}$ is 5 when the TDD UL-DL configuration of the SCell is 3, $M_{DL\_HARQ}$ is 6 when the TDD UL-DL configuration of the SCell is 4, $M_{DL\_HARQ}$ is 7 when the TDD UL-DL configuration of the SCell is 5, and $M_{DL\_HARQ}$ is 4 when the TDD UL-DL configuration of the SCell is 6.

Therefore, when an $M_{DL\_HARQ}$ value of Equation 1 is determined based alt 2 of Method 1, the soft buffer of the UE may be effectively utilized. That is, when the $M_{DL\_HARQ}$ value is applied as a value based on alt 2 of Table 9, the UE divides a total soft channel bit size $N'_{soft}$ corresponding to a category of the UE for each serving cell as shown in Equation 1. A size identical for each serving cell is divided by a MIMO transmission mode $K_{MIMO}$, the maximum number of DL HARQ processes $M_{DL\_HARQ}$, and the number of code blocks C for each TB, so as to determine a size of soft channel bits that a single code block may occupy.

Although Method 1 has been illustrated based on Case 1 of Table 7, Method 1 may be applied to other Cases 2, 3, and 4. However, Cases 2, 3, and 4 may provide lower efficiency than Case 1.

Method 2: A Method of Selectively Applying Method 1 and the Existing Maximum Number of HARQ Processes The current standard defines the maximum number of DL HARQ processes that may be provided based on a DL HARQ timing corresponding to an FDD carrier and the maximum number of DL HARQ processes that may be provided based on a DL HARQ timing corresponding to seven TDD UL-DL configurations of a TDD carrier. This may be listed, as shown below.

TABLE 10

| TDD UL/DL configuration | Maximum number of DL HARQ processes |
|---|---|
| 0 | 4 |
| 1 | 7 |
| 2 | 10 |
| 3 | 9 |
| 4 | 12 |
| 5 | 15 |
| 6 | 6 |
| FDD | 8 |

In table 10, the maximum number of DL HARQ processes may correspond to an $M_{DL\_HARQ}$ value and thus, by selectively using the existing maximum number of DL HARQ processes of Table 10 and the maximum number of DL HARQ processes determined by taking into account a DL subframe that is actually available for DL PDSCH scheduling on an SCell according to alt 2 of Method 1, the soft channel bits that are stored in a UE may be controlled.

(1) Method 2-1

For the values that are different from existing values from among new $M_{DL\_HARQ}$ values (alt 2) generated through Method 1, the smallest value may be selected from among existing values greater than a corresponding new $M_{DL\_HARQ}$. This may be listed, as shown below.

TABLE 11

Case 1: FDD(PCell)-TDD(SCell) CA with self-scheduling

| | | | $M_{DL\_HARQ}$ | |
| --- | --- | --- | --- | --- |
| | | | | SCell |
| PCell | SCell | PCell | alt 2 | alt 2-1 |
| FDD | TDD UL-DL configuration 0 | 8 | 4 | 4 |
| FDD | TDD UL-DL configuration 1 | 8 | 5 | 6 |
| FDD | TDD UL-DL configuration 2 | 8 | 6 | 6 |
| FDD | TDD UL-DL configuration 3 | 8 | 5 | 6 |
| FDD | TDD UL-DL configuration 4 | 8 | 6 | 6 |
| FDD | TDD UL-DL configuration 5 | 8 | 7 | 7 |
| FDD | TDD UL-DL configuration 6 | 8 | 4 | 4 |

In Table 11, alt 2-1 denotes an $M_{DL\_HARQ}$ value according to Method 2-1.

For example, when the TDD UL-DL configuration of the SCell is 0, $M_{DL\_HARQ}$ for the corresponding SCell is 4. When the TDD UL-DL configuration of the SCell is 1, $M_{DL\_HARQ}$ for the corresponding SCell is 6. When the TDD UL-DL configuration of the SCell is 3, $M_{DL\_HARQ}$ for the corresponding SCell is 6. Method 2-1 may be expressed by the following construction.

TABLE 12 if $M'_{DL\_HARQ} \in \{4,6,7,8,9,10,12,15\}$, $M_{DL\_HARQ} = M'_{DL\_HARQ}$
else $M_{DL\_HARQ}$ such that $M'_{DL\_HARQ}$ < minimum value of $\{4,6,7,8,9,10,12,15\}$ Here, $M'_{DL\_HARQ}$ denotes a new $M_{DL\_HARQ}$ value generated through Method 1, and $M_{DL\_HARQ}$ denotes a final $M_{DL\_HARQ}$ value obtained based on Method 2-1.

The above described Method 2-1 may be advantageous in that it may reuse an $M_{DL\_HARQ}$ value which has been defined and embodied, but may have a non-optimal soft buffer partition. A soft buffer is partitioned by taking into consideration a higher $M_{DL\_HARQ}$ value than it really is and thus, the number of soft channel bits for a single code block may be smaller than Method 1.

(2) Method 2-2

For the values that are different from existing values from among new $M_{DL\_HARQ}$ values (alt 2) generated through Method 1, the largest value may be selected from among existing values smaller than a corresponding new $M_{DL\_HARQ}$. This may be listed, as shown below.

TABLE 13

Case 1: FDD(PCell)-TDD(SCell) CA with self-scheduling

| | | | $M_{DL\_HARQ}$ | |
| --- | --- | --- | --- | --- |
| | | | | SCell |
| PCell | SCell | PCell | alt 2 | alt 2-2 |
| FDD | TDD UL-DL configuration 0 | 8 | 4 | 4 |
| FDD | TDD UL-DL configuration 1 | 8 | 5 | 4 |
| FDD | TDD UL-DL configuration 2 | 8 | 6 | 6 |
| FDD | TDD UL-DL configuration 3 | 8 | 5 | 4 |
| FDD | TDD UL-DL configuration 4 | 8 | 6 | 6 |
| FDD | TDD UL-DL configuration 5 | 8 | 7 | 7 |
| FDD | TDD UL-DL configuration 6 | 8 | 4 | 4 |

In Table 13, alt 2-2 denotes an $M_{DL\_HARQ}$ value according to Method 2-2. For example, when the TDD UL-DL configuration of the SCell is 0, $M_{DL\_HARQ}$ for the corresponding SCell is 4. When the TDD UL-DL configuration of the SCell is 1, $M_{DL\_HARQ}$ for the corresponding SCell is 4. When the TDD UL-DL configuration of the SCell is 3, $M_{DL\_HARQ}$ for the corresponding SCell is 4.

Method 2-2 may be expressed by the following construction.

TABLE 14 if $M'_{DL\_HARQ} \in \{4,6,7,8,9,10,12,15\}$, $M_{DL\_HARQ} = M'_{DL\_HARQ}$
else $M_{DL\_HARQ}$ such that $M'_{DL\_HARQ}$ > largest value of $\{4,6,7,8,9,10,12,15\}$ Here, $M'_{DL\_HARQ}$ denotes a new $M_{DL\_HARQ}$ value generated through Method 1, and $M_{DL\_HARQ}$ denotes a final $M_{DL\_HARQ}$ value obtained based on Method 2-2.

The above described Method 2-2 is to select the largest $M_{DL\_HARQ}$ value from among existing values that are smaller than a corresponding new $M_{DL\_HARQ}$ value generated by Method 1, which is different from the Method 2-1. Therefore, according to Method 2-2, a size of soft channel bits utilized for a single code block may be greater than Method 2-1, and even Method 1. However, a smaller $M_{DL\_HARQ}$ value has been taken into consideration and thus, "HARQ blocking" may occur and performance of the UE may be deteriorated due to a plurality of NACKs and a plurality of times of retransmissions incurred by a poor channel condition. However, this may not frequently occur. Here, "HARQ blocking" refers to a situation in which a soft buffer that operates based on a smaller number of HARQ processes than the number of HARQ processes for a possible retransmission, is required to store a larger number of soft channel bits than the assumed number of soft channel bits at a predetermined point in time, and fails to store a few of the soft channel bits due to an insufficient memory.

Method 3: A Method of Storing Soft Channel Bits Preferentially for a PCell or an FDD Serving Cell Method 3 applies a soft buffer partitioning method different for each serving cell, unlike Method 1 and Method 2. Both the described Method 1 and Method 2 have a soft buffer size identical for each serving cell, and control a soft buffer by defining and applying different $M_{DL\_HARQ}$ values in the soft buffer size divided for each serving cell. However, according to Method 3, a soft buffer size may be different for each serving cell. In particular, by executing soft buffer partitioning, the present invention allocates a soft buffer size preferentially for a PCell or an FDD serving cell.

Figure 9:
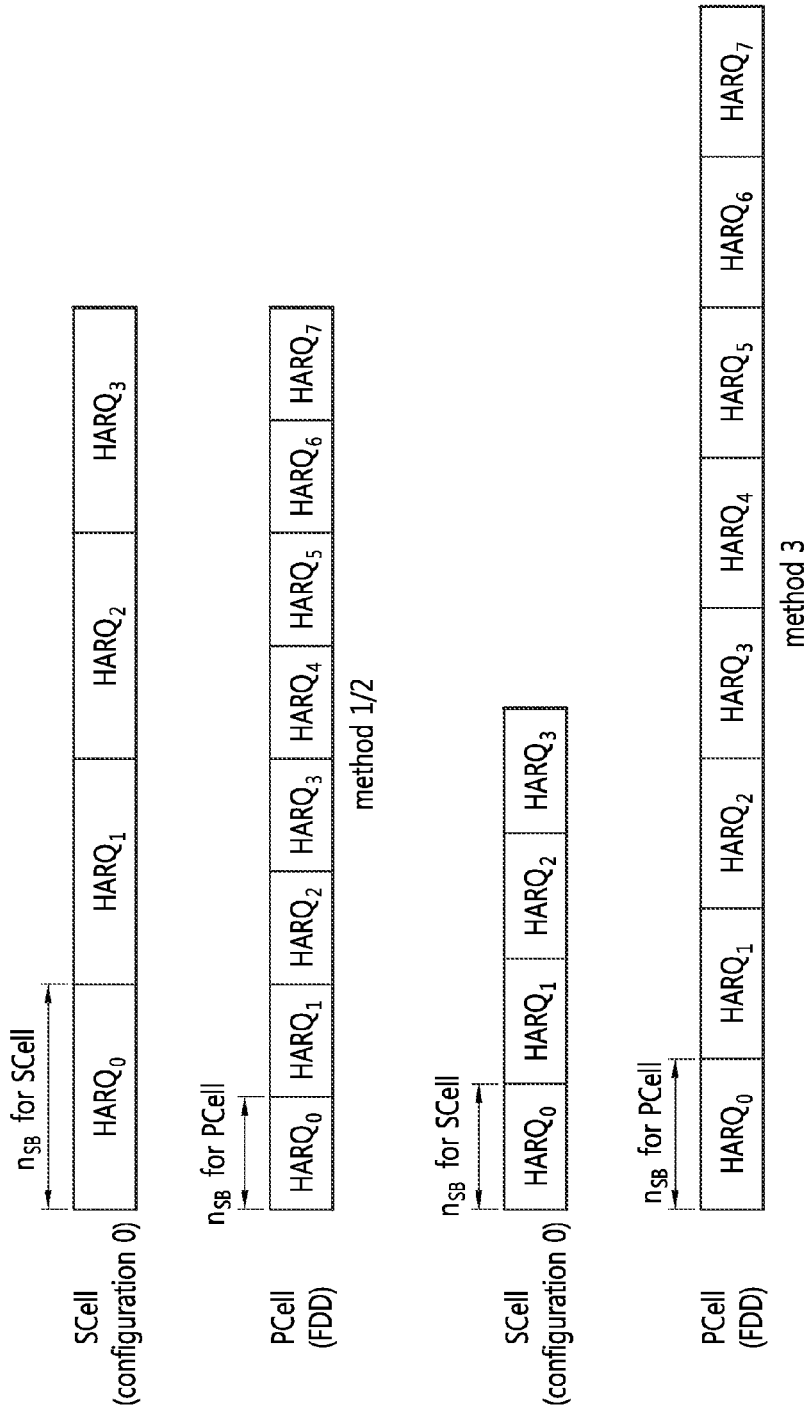
FIG. 9 illustrates an example of a soft buffer partitioning method according to Method 1 and Method 2 and an example of a soft buffer partitioning method according to Method 3.

FIG. 9 illustrates an example of a soft buffer partitioning method according to Method 1and Method 2, and a soft buffer partitioning method according to Method 3.

Referring to FIG. 9, an identical soft buffer partition is applied to a PCell and an SCell according to Method 1 and Method 2, whereas different soft buffer partitions may be applied to a PCell and an SCell according to Method 3. In this instance, the number of soft channel bits for PDCSH transmission may be configured to be large for a predetermined serving cell, for example, a PCell or an FDD serving cell. For example, when the number of soft channel bits for PDSCH transmission with respect to a PCell or an FDD serving cell is configured to be relatively large, the reliability of PDSCH transmission executed on the PCell or the FDD serving cell may be improved, or the reliability of PDSCH transmission executed on an FDD serving cell including a larger number of DL subframes than a TDD serving cell may be improved.

To configure the number of soft channel bits to be large with respect to a predetermined serving cell, a weight factor α for the predetermined serving cell may be introduced. Here, a may be defined as a predetermined value, or may be transmitted from a base station to a UE through an RRC signaling. For example, a may be included in TDD-FDD CA configuration information and may be transmitted from a base station to a UE.

(1) Method 3-1

Method 3-1 is to equally allocate, to the remaining serving cells, the remaining area after excluding a soft buffer size allocated to a predetermined serving cell, by summing all $\min(M_{DL\_HARQ\_i}, M_{limit})$ values of the remaining serving cells.

Figure 10:
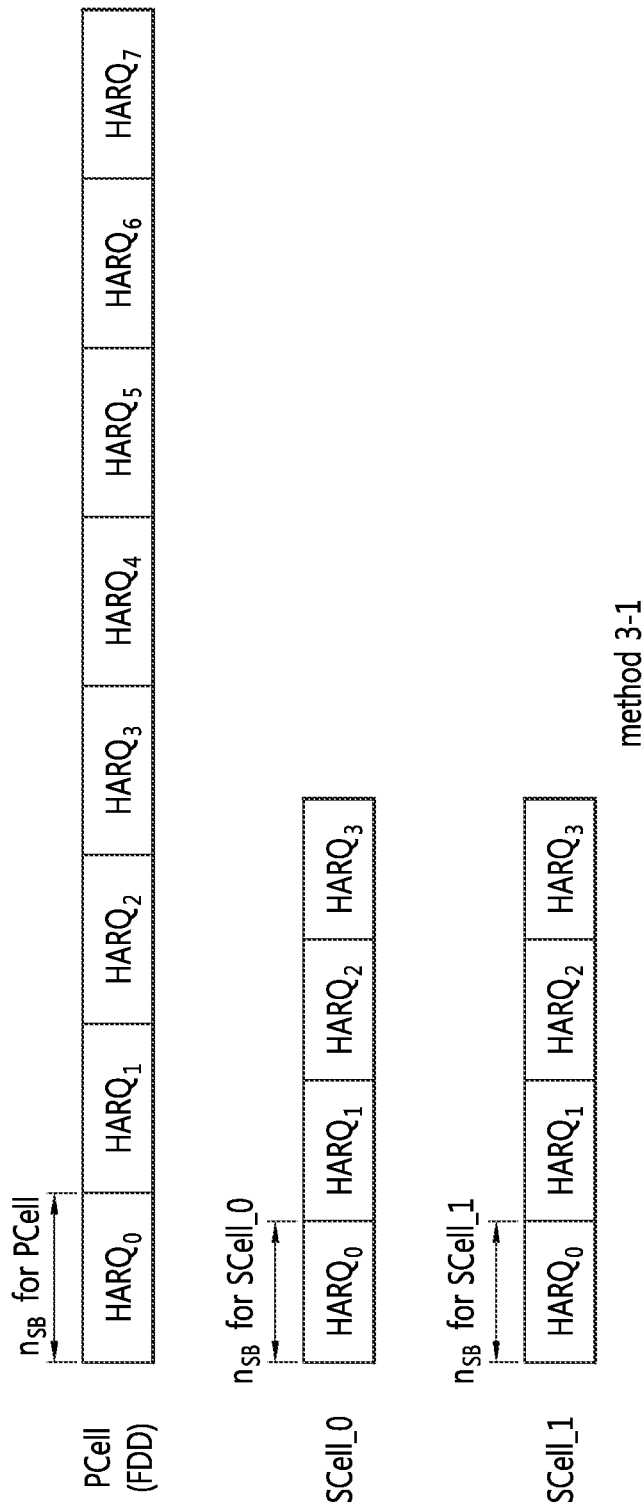
FIG. 10 illustrates an example of soft buffer allocation according to Method 3-1.

FIG. 10 illustrates an example of soft buffer allocation according to Method 3-1.

Referring to FIG. 10, when a PCell, an SCell 0, and an SCell 1 are configured for a UE, a larger number of soft channel bits are allocated to the PCell (or an FDD serving cell), in comparison to other serving cells. For the remaining serving cells SCell 0 and the SCell 1 after excluding the PCell, the remaining soft buffer area may be equally allocated.

The number of soft channel bits for a single code block in a predetermined serving cell such as the PCell (or the FDD serving cell) may be based on the following Equation 2.

$$n_{SB} = \min\left(N_{cb}, \left\lfloor \frac{N'_{soft} \cdot \alpha}{C \cdot N_{cells}^{DL} \cdot K_{MIMO} \cdot \min(M_{DL\_HARQ}, M_{limit})} \right\rfloor\right),$$
$$1 \le \alpha < N_{cells}^{DL}$$

[Equation 2]

Here, α is a weight factor, and when α is 1, it is identical to Equation 1.

The number of soft channel bits for a single code block in the remaining serving cells after excluding the predetermined serving cell may be expressed by the following Equation 3 or 4.

$$n_{SB} = $$ [Equation 3]
$$\min\left(N_{cb}, \left\lfloor \frac{N'_{soft}(N_{cells}^{DL} - \alpha)}{C \cdot N_{cells}^{DL} \cdot K_{MIMO} \cdot \sum_{i=2}^{N_{cells}^{DL}} \min(M_{DL\_HARQ\_i}, M_{limit})} \right\rfloor\right)$$

$$n_{SB} = $$ [Equation 4]
$$\min\left(N_{cb}, \left\lfloor \frac{N'_{soft}(N_{cells}^{DL} - \alpha)}{C \cdot N_{cells}^{DL} \cdot K_{MIMO} \cdot \sum_{i=N_{cells}^{FDD}}^{N_{cells}^{DL}} \min(M_{DL\_HARQ\_i}, M_{limit})} \right\rfloor\right)$$

Here, Equation 3 corresponds to a case in which only the PCell is weighted, and Equation 4 corresponds to a case in which only the FDD serving cell is weighted. $N^{FDD}_{cells}$ denotes the number of FDD serving cells configured for the UE in the case of TDD-FDD CA.

(2) Method 3-2

Figure 11:
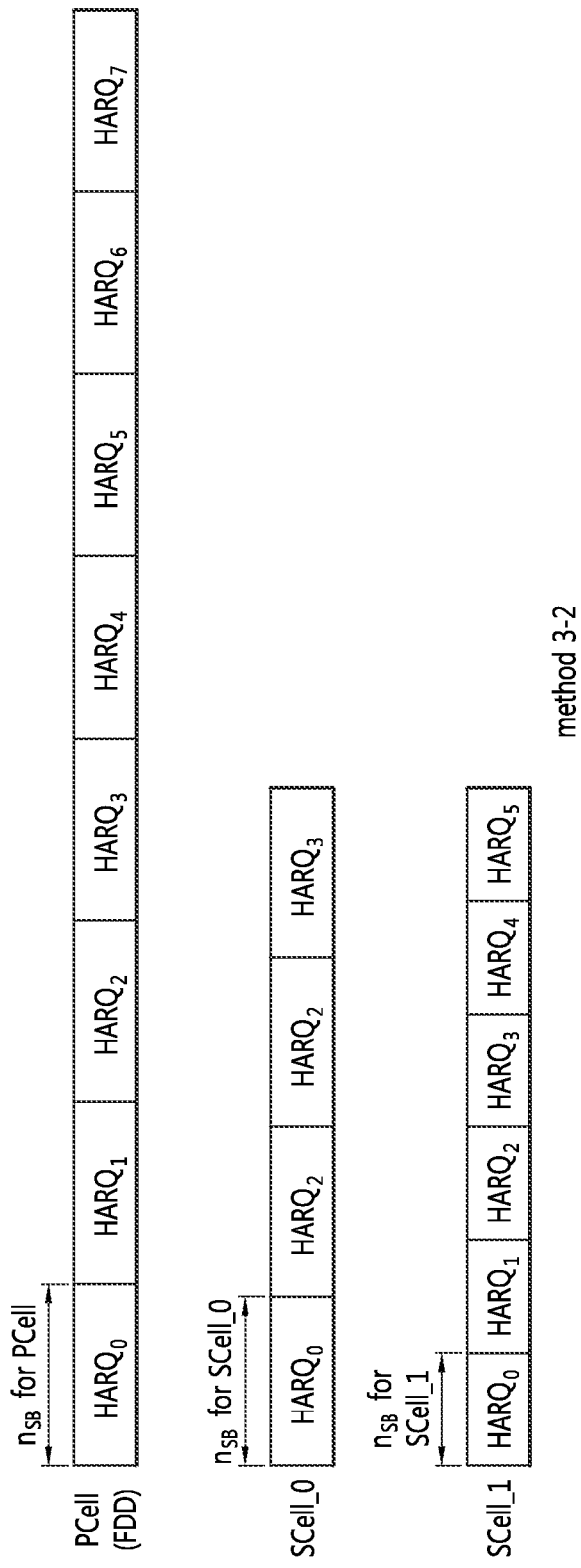
FIG. 11 illustrates an example of soft buffer allocation according to Method 3-2.

Unlike Method 3-1, Method 3-2 is to equally divide the remaining area after excluding the soft buffer size allocated to a predetermined serving cell, for the remaining serving cells, and to execute allocation of an equally divided area for each serving cell based on $\min(M_{DL\_HARQ\_i}, M_{limit})$ FIG. 11 illustrates an example of soft buffer allocation according to Method 3-2.

Referring to FIG. 11, when a PCell, an SCell 0, and an SCell 1 are configured for a UE, a larger number of soft channel bits are allocated to the PCell (or an FDD serving cell), in comparison to other serving cells. Although the soft buffer area sizes of the remaining serving cells SCell 0 and SCell 1 after excluding the PCell are identical, a soft buffer area may be allocated to the SCell 0 and the SCell 1 based on a corresponding $\min(M_{DL\_HARQ\_i}, M_{limit})$.

The number of soft channel bits for a single code block in a predetermined serving cell such as the PCell (or the FDD serving cell) may be based on the following Equation 5.

$$n_{SB} = $$ [Equation 5]
$$\min\left(N_{cb}, \left\lfloor \frac{N'_{soft} \cdot \alpha}{C \cdot N_{cells}^{DL} \cdot K_{MIMO} \cdot \min(M_{DL\_HARQ}, M_{limit})} \right\rfloor\right),$$
$$1 \le \alpha < N_{cells}^{DL}$$

Here, α is a weight factor, and when α is 1, it is identical to Equation 1. The number of soft channel bits for a single code block in the remaining serving cells after excluding the predetermined serving cell may be expressed by the following Equation 6 or 7.

$$n_{SB} = \min\left(N_{cb}, \left\lfloor \frac{N'_{soft}(N_{cells}^{DL} - \alpha)}{C \cdot K_{MIMO} \cdot (N_{cells}^{DL} - 1) \cdot \min(M_{DL\_HARQ\_i}, M_{limit})} \right\rfloor\right)$$ [Equation 6]

$$n_{SB} = \min\left(N_{cb}, \left\lfloor \frac{N'_{soft}(N_{cells}^{DL} - \alpha)}{C \cdot K_{MIMO} \cdot (N_{cells}^{DL} - N_{cells}^{FDD}) \cdot \min(M_{DL\_HARQ\_i}, M_{limit})} \right\rfloor\right)$$ [Equation 7]

Here, Equation 6 corresponds to a case in which only the PCell is weighted, and Equation 7 corresponds to a case in which only the FDD serving cell is weighted. $N^{FDD}_{cells}$ denotes the number of FDD serving cells configured for the UE in the case of TDD-FDD CA.

Through Method 3 as described above, the UE may apply a weight to secure reliable reception for PDSCH transmission executed on a predetermined serving cell(s), and may control the weight. Method 3 may obtain a result identical to the above described Method 1 or Method 2, depending on a weight value, and may give the degree of freedom between an embodiment and a performance. In this instance, an $M_{DL\_HARQ}$ value used in Method 3 may use an existing value, and may use a new $M_{DL\_HARQ}$ value, defined based on Method 1, Method 2, or Method 4 to be described below.

Method 4: A Method of Applying $M_{DL\_HARQ}=M_{limit}$ to All Serving Cells

Method 4 applies $M_{DL\_HARQ}=M_{limit}$ to all serving cells, irrespective of the TDD-FDD CA and a scheduling mode (that is, irrespective of Case 1 through Case 4 of Table 7). Therefore, $M_{DL\_HARQ}=M_{limit}=8$ with respect to all serving cells, irrespective of a duplex mode. In this instance, $M_{limit}$ is an example, and may have a different value depending on cases. According to Method 4, performance deterioration may occur in some serving cells and HARQ blocking may be incurred depending on cases but this may be readily embodied.

Figure 12:
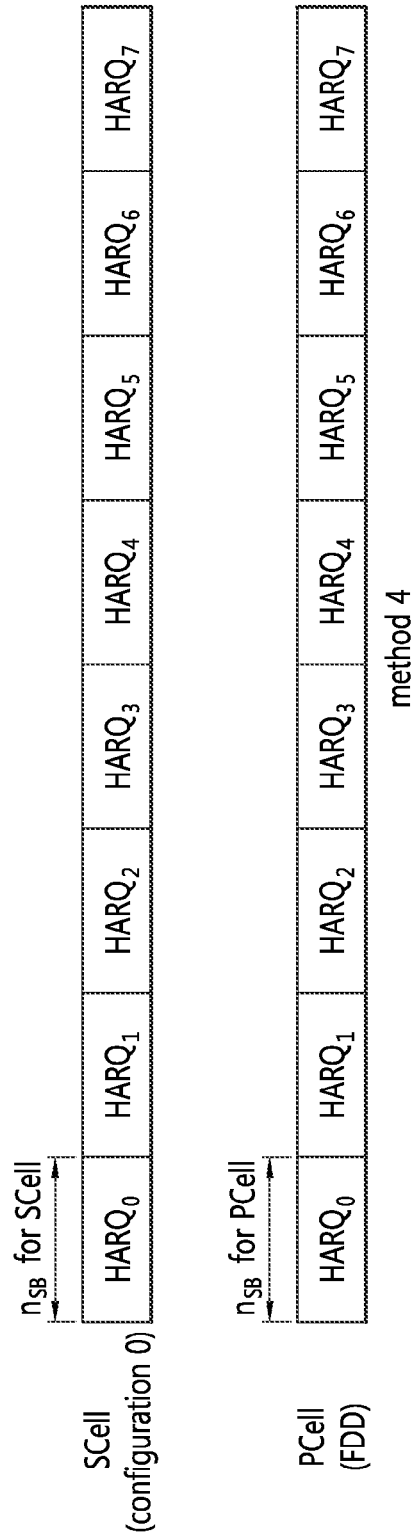
FIG. 12 illustrates an example of soft buffer allocation according to Method 4.

FIG. 12 illustrates an example of soft buffer allocation according to Method 4.

Referring to FIG. 12, a soft buffer of an identical size is allocated to all serving cells that configure the TDD-FDD CA configuration for a UE, and an identical number of soft channel bits are stored.

According to Method 4, above mentioned Equation 1 may be expressed as follows.

$$n_{SB} = \min\left(N_{cb}, \left\lfloor \frac{N'_{soft}}{C \cdot N^{DL}_{cells} \cdot K_{MIMO} \cdot M_{limit}} \right\rfloor\right)$$ Equation 8

Method 5: A Method of Executing Soft Buffer Partitioning Based on a New $M_{limit}$ Value Method 5 has proposed a new $M_{limit}$ value, instead of an existing $M_{limit}=8$. In this instance, soft buffer partitioning may be executed based on the new $M_{limit}$ value, and soft buffer partitioning may be executed further based on a total sum of the number of HARQ processes of all serving cells. The reason that defines the new $M_{limit}$ value is for Case 2 of Table 7, and for Case 3/4 potentially.

FIG. 13 illustrates examples of the maximum number of DL HARQ processes according to Case 1 and Case 2.

Referring to FIG. 13, Case 1 corresponds to a case in which an FDD(PCell)-TDD(SCell) CA and self-scheduling are configured for a UE, and Case 2 corresponds to a case in which a TDD(PCell)-FDD(SCell) CA and self-scheduling are configured for a UE. In addition, alt 1 corresponds to a case that uses an existing method to count the number of DL HARQ processes corresponding to a DL reference configuration-based HARQ timing, and alt 2 corresponds to a case that counts the number of DL HARQ processes by taking into consideration a DL subframe that is available for DL PDSCH scheduling.

In FIG. 13, Method 1 (alt 2) has been applied to Case 1 and Case 2, and it is recognized that all of the $M_{DL\_HARQ}$ values for an SCell in Case 2 are greater than an existing $M_{limit}=8$, unlike Case 1. A DL HARQ timing method applicable in Case 2 may include a method of applying a new DL HARQ timing and a method of applying a DL reference timing. In particular, when a new DL HARQ timing is applied, a $M_{DL\_HARQ}$ value is significantly greater than $M_{limit}=8$. Therefore, when the existing $M_{limit}$ value is maintained as it is, a great number of times of "overbooking" may occur in Case 2. Here, "overbooking" refers to a case in which $M_{DL\_HARQ}$ is greater than 8, and $\min(M_{DL\_HARQ}, M_{limit})$ is always limited to 8.

In the existing TDD, the overbooking is allowed. For example, overbooking may occur when a TDD UL-DL configuration corresponds to TDD UL-DL configuration 2, 4, or 5. However, for ease of embodiment and for the support of a dual mode UE (an existing UE that supports both an FDD mode and a TDD mode), the $M_{limit}$ value is limited to 8. However, when a TDD-FDD CA has already been configured for a UE and has operated, the support of the dual mode UE that operates as one of a TDD carrier and an FDD carrier may become insignificant. Therefore, a new $M_{limit}$ value may be required for improving performance of a UE. A relatively higher $M_{limit}$ value may provide a low HARQ blocking probability, and a relatively lower $M_{limit}$ value may enable a greater number of soft channel bits per TB to be stored and thus, a higher reliability may be provided. Therefore, a HARQ process performance of the UE may be controlled by setting an $M_{limit}$ value based on a situation. Hereinafter, descriptions will be provided under the assumption that a relatively higher $M_{limit}$ value is set.

(1) Method 5-1

When a new $M_{limit}$ value greater than an existing value is allowed for $\min(M_{DL\_HARQ}, M_{limit})$ of Equation 1, the number of DL HARQ processes where overbooking occur may be minimized in Case 2 or the like. Here, the new $M_{limit}$ value may have a fixed value for a predetermined TDD-FDD CA configuration (for example Case 2), or may be indicated through an RRC signaling.

FIG. 14 illustrates an example of soft buffer allocation according to Method 5-1. FIG. 14 corresponds to a case in which a PCell is a carrier of TDD UL-DL configuration 0, an SCell is an FDD carrier, and self-scheduling is configured for a UE. In addition, FIG. 14 assumes that $M_{limit}$ is 12.

Referring to FIG. 14, P-0, P-1, and the like denote DL HARQ processes of a PCell, and S-0, S-1, and the like denote DL HARQ processes of an SCell. As illustrated in FIG. 14, $M_{limit}$ is 12 and thus, overbooking occurs in S-12 and S-13. In comparison with an existing case that has 6 DL HARQ processes where overbooking occur when $M_{limit}=8$, it is recognize that there may be a smaller number of DL HARQ processes where overbooking occur.

By setting an $M_{limit}$ value to a higher value than an existing value of 8, a fewer number of times of process drop may occur. However, when a PCell is a carrier of TDD UL-DL configuration 0 and an SCell is an FDD carrier in Case 2, the PCell has a maximum of four DL HARQ processes and the SCell has a maximum of 14 DL HARQ processes, which have a great difference between them. When a difference in the maximum number of DL HARQ processes between the serving cells is high, a large number of DL HARQ processes may be dropped, and particularly, HARQ blocking may frequently occur when a channel environment is poor and thus, the performance of the UE may be deteriorated.

(2) Method 5-2

Method 5-2 is to set an $M_{limit}$ value to be higher than an existing value of 8, and to add $M_{DL\_HARQ}$ values of all of the serving cells so as to enable a code block of each serving to have an identical number of soft channel bits. This may be listed, as shown below.

$$n_{SB} = \min\left(N_{cb}, \left\lfloor \frac{N'_{soft}}{C \cdot K_{MIMO} \cdot \sum_{i=0}^{N^{DL}_{cells}-1} \min(M_{DL\_HARQ}, M_{newlimit})} \right\rfloor\right)$$ [Equation 9]

FIG. 15 illustrates an example of soft buffer allocation according to Method 5-2. FIG. 15 corresponds to a case in which a PCell is a carrier of TDD UL-DL configuration 0, an SCell is an FDD carrier, and self-scheduling is configured for a UE. In addition, FIG. 15 assumes that $M_{limit}$ is 12.

Referring to FIG. 15, P-0, P-1, and the like denote DL HARQ processes of a PCell, and S-0, S-1, and the like denote DL HARQ processes of an SCell. In FIG. 15, an identical number of soft channel bits may be allocated to each DL HARQ process of the PCell and the SCell.

Method 6: A Method of Applying an $M_{DL\_HARQ}$ Value of a PCell to Another Serving Cell (SCell)

Method 6 is to apply an $M_{DL\_HARQ}$ value of the PCell as an $M_{DL\_HARQ}$ value of another serving cell. In this instance, a soft buffer may be partitioned based on an $M_{DL\_HARQ}$ value of the PCell with respect to all of the serving cells, irrespective of a DL HARQ timing of the SCell. Method 6 may be applied to all of the cases, or may be applied to a predetermined case (for example, Case 2) as a sub-optimal method.

Figure 16:
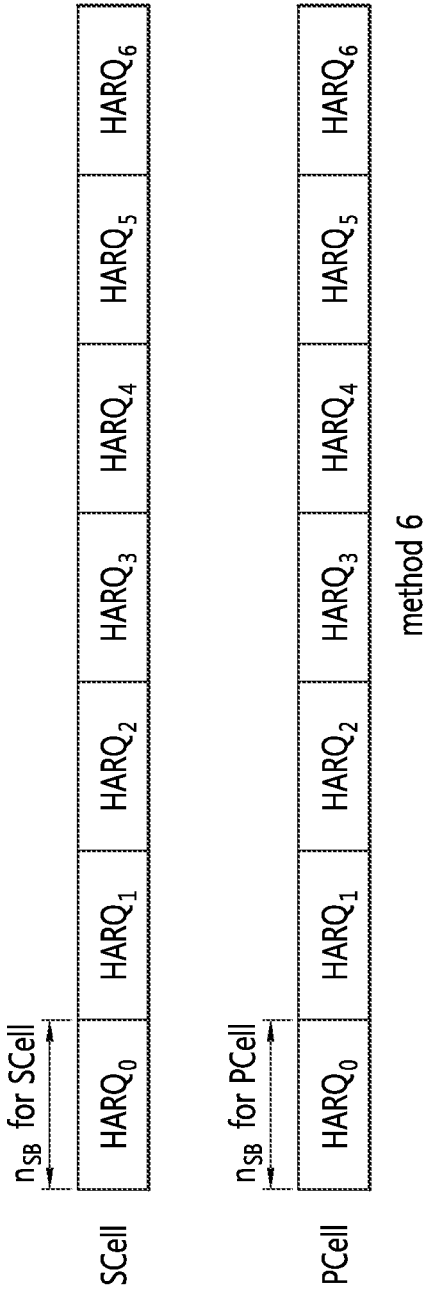
FIG. 16 illustrates an example of soft buffer allocation according to Method 6.

FIG. 16 illustrates an example of soft buffer allocation according to Method 6.

Referring to FIG. 16, a soft buffer of a UE may be equally allocated to a PCell and an SCell.

When at least one of Method 1 to Method 6 of the present invention is applied, a UE for which a TDD-FDD CA is configured may effectively control a soft buffer, and may enhance the HARQ reliability.

Figure 17:
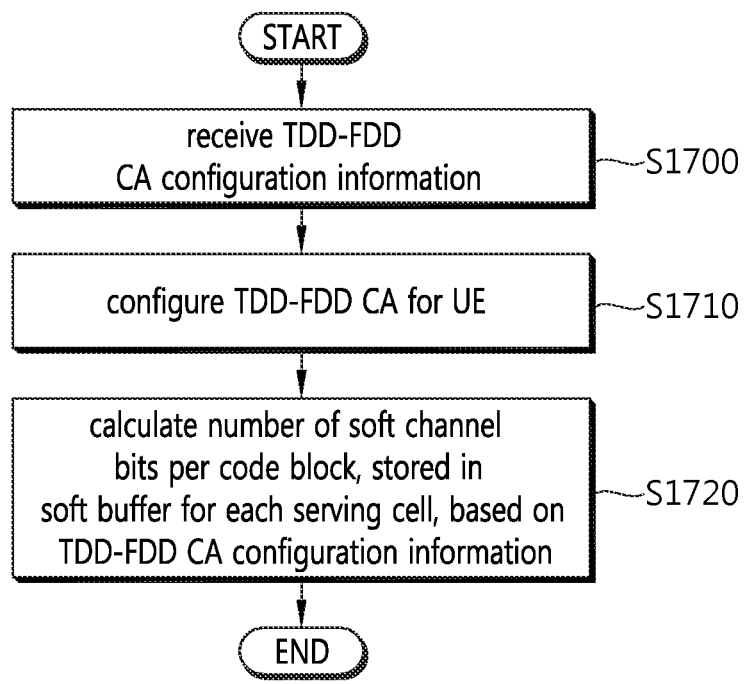
FIG. 17 is a flowchart illustrating a soft buffer controlling method of a UE according to an exemplary embodiment of the present invention.

FIG. 17 is a flowchart illustrating a soft buffer controlling method of a UE according to an exemplary embodiment of the present invention.

A UE receives TDD-FDD CA configuration information from a base station in operation S1700. The UE receives the TDD-FDD CA configuration information through an RRC signaling. In addition, the UE may further receive cross-carrier scheduling configuration information from the base station (not illustrated).

The UE configures a TDD-FDD CA based on the TDD-FDD CA configuration information in operation S1710. For example, based on the TDD-FDD CA configuration information, the UE may configure a PCell as a TDD carrier, and may configure an SCell as an FDD carrier, in a self-scheduling mode (Case 1). As another example, based on the TDD-FDD CA configuration information, the UE may configure a PCell as an FDD carrier, and may configure an SCell as a TDD carrier, in a self-scheduling mode (Case 2). As another example, based on the cross-carrier scheduling configuration information, the UE may configure a PCell as a TDD carrier and may configure an SCell as an FDD carrier, in a cross-carrier scheduling mode (Case 3). As another example, based on the cross-carrier scheduling configuration information, the UE may configure a PCell as an FDD carrier and may configure an SCell as a TDD carrier, in a cross-carrier scheduling mode (Case 4).

The UE may calculate the number of soft channel bits per code block, which are stored in a soft buffer of the UE for each serving cell, based on the TDD-FDD CA configuration information in operation S1720. The number of soft channel bits per code block may be calculated based on Equation 1. In addition, the number of soft channel bits per code block may be calculated based on at least one of Method 1 to Method 6.

For example, for the SCell, the number of soft channel bits per code block may be calculated by detecting $M_{DL\_HARQ}$ which is the maximum number of DL HARQ processes, by taking into consideration a DL subframe that is actually available for DL PDSCH scheduling on the SCell, and applying the same to the above mentioned Equation 1.

As another example, for the SCell, the number of soft channel bits per code block may be calculated by selectively using an existing $M_{DL\_HARQ}$ when a DL HARQ timing of the PCell is applied and a new $M_{DL\_HARQ}$ which is obtained by taking into account a DL subframe that is actually available for DL PDSCH scheduling on the SCell.

As another example, the number of soft channel bits per code block may be calculated based on a weight factor α for a predetermined serving cell. In this instance, the number of soft channel bits per code block of the predetermined serving cell to which the weight factor α is applied may be calculated based on Equation 2 or Equation 5. In this instance, the number of soft channel bits per code block of the remaining serving cells may be calculated based on Equation 3, 4, 6, or 7, respectively.

As another example, the number of soft channel bits per code block may be calculated by setting an $M_{DL\_HARQ}$ value to be identical to an $M_{limit}$ value for all of the serving cells. In this instance, the number of soft channel bits per code block may be calculated based on Equation 8.

As another example, the number of soft channel bits per code block may be calculated by defining a new $M_{limit}$ value. For example, the $M_{limit}$ value may be set to be lower or higher than the existing value of 8. In addition, an identical number of soft channel bits per code block may be allocated to each serving cell by setting the $M_{limit}$ value to be higher than the existing value of 8, and adding $M_{DL\_HARQ}$ values of all of the serving cells. In this instance, the number of soft channel bits per code block may be calculated based on Equation 9.

Any one of the above described methods may be applied to Case 1 to Case 4, or any one of the methods may be applied to one of Cases 1 to 4 and another method may be applied to another case.

The UE may execute HARQ processes associated with a plurality of Component Carriers (CCs), based on the number of soft channel bits per code block of each serving cell.

Figure 18:
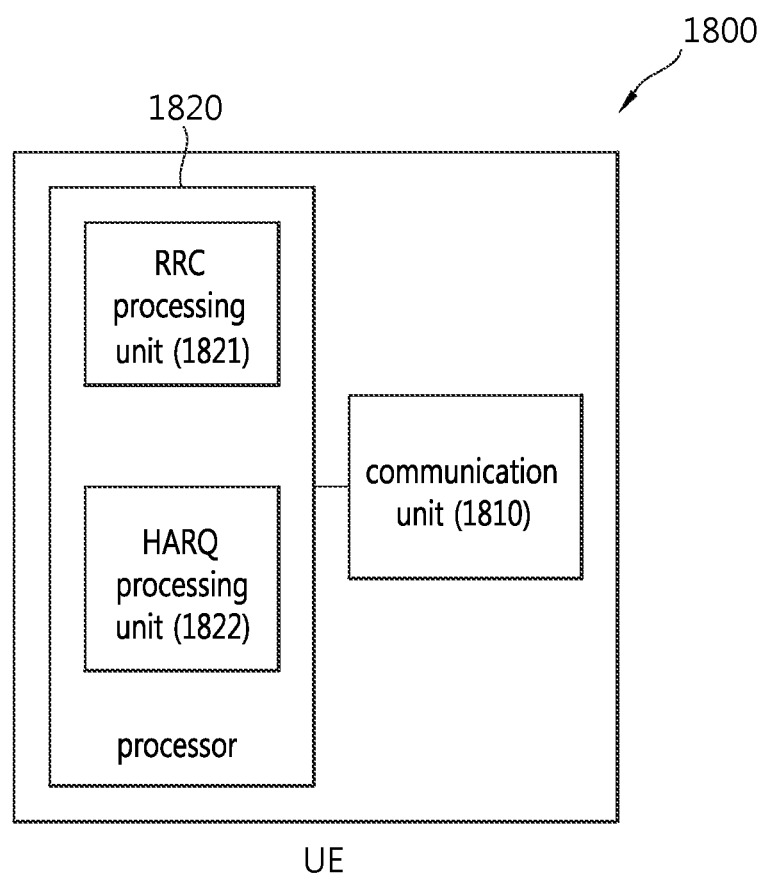
FIG. 18 is a block diagram illustrating a UE according to an exemplary embodiment of the present invention.

FIG. 18 is a block diagram illustrating a UE according to an exemplary embodiment of the present invention.

Referring to FIG. 18, a UE 1800 includes a communication unit 1810 and a processor 1820. The processor 1820 executes a process and a control for operations of the above described present invention. The processor 1820 may include an RRC processing unit 1811 and a HARQ processing unit 1812.

The communication unit 1810 receives TDD-FDD CA configuration information from a base station. The communication unit 1810 receives the TDD-FDD CA configuration information through an RRC signaling. In addition, the communication unit 1810 may further receive cross-carrier scheduling configuration information from the base station.

The RRC processing unit 1821 applies a TDD-FDD CA configuration to the UE 1800 based on the TDD-FDD CA configuration information. In addition, the RRC processing unit 1821 may apply cross-carrier scheduling to the UE 1800 based on the cross-carrier scheduling configuration information.

The HARQ processing unit 1822 calculates the number of soft channel bits per code block, which are stored in a soft buffer of the UE for each serving cell, based on the TDD-FDD CA configuration information. The HARQ processing unit 1822 may calculate the number of soft channel bits per code block based on Equation 1. In addition, the number of soft channel bits per code block may be calculated based on at least one of Method 1 to Method 6.

For example, the HARQ processing unit 1822 may calculate the number of soft channel bits per code block by detecting $M_{DL\_HARQ}$ which is the maximum number of DL HARQ processes, by taking into consideration a DL subframe that is actually available for DL PDSCH scheduling on the SCell, and applying the same to the above mentioned Equation 1, for the SCell.

As another example, the HARQ processing unit 1822 may calculate the number of soft channel bits per code block by selectively using an existing $M_{DL\_HARQ}$ when a DL HARQ timing of the PCell is applied and a new $M_{DL\_HARQ}$ which is obtained by taking into account a DL subframe that is actually available for DL PDSCH scheduling on the SCell, for the SCell.

As another example, the HARQ processing unit 1822 may calculate the number of soft channel bits per code block based on a weight factor α for a predetermined serving cell. In this instance, the HARQ processing unit 1822 may calculate the number of soft channel bits per code block of the predetermined serving cell to which the weight factor α is applied, based on Equation 2 or Equation 5. In this instance, the HARQ processing unit 1822 may calculate the number of soft channel bits per code block for the remaining serving cells, based on Equation 3, 4, 6, or 7.

As another example, the HARQ processing unit 1822 may calculate the number of soft channel bits per code block by setting an $M_{DL\_HARQ}$ value to be identical to an $M_{limit}$ value for all of the serving cells. In this instance, the HARQ processing unit 1822 may calculate the number of soft channel bits per code block based on Equation 8.

As another example, the HARQ processing unit 1822 may calculate the number of soft channel bits per code block by defining a new $M_{limit}$ value. For example, the $M_{limit}$ value may be set to be lower or higher than the existing value of 8. In addition, each serving cell may have an identical number of soft channel bits per code block by setting the $M_{limit}$ value to be higher than the existing value of 8, and adding $M_{DL\_HARQ}$ values of all of the serving cells. In this instance, the HARQ processing unit 1822 may calculate the number of soft channel bits per code block based on Equation 9.

The HARQ processing unit 1822 may execute HARQ processes associated with a plurality of Component Carriers (CCs) in a TDD-FDD CA environment, based on the number of soft channel bits per code block for each serving cell.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

What is claimed is:

1. A method of performing a Hybrid Automatic Repeat reQuest (HARQ) operation by a user equipment (UE), the method comprising:
   establishing a Radio Resource Control (RRC) connection with a base station through a first serving cell, the first serving cell supporting a Time Division Duplex (TDD) mode;
   receiving an RRC message from the base station through the first serving cell, the RRC message comprising carrier aggregation (CA) configuration information, the CA configuration information comprising information of a second serving cell supporting a Frequency Division Duplex (FDD) mode, and the first serving cell and the second serving cell being aggregated by a TDD-FDD CA scheme; and
   when the second serving cell is a secondary serving cell (SCell) associated with the first serving cell through the TDD-FDD CA scheme, executing, by the UE, a process comprising:
   determining a maximum number of DL HARQ processes for the second serving cell based on an uplink(UL)/downlink(DL) configuration of the first serving cell, wherein the UL/DL configuration is a DL reference UL/DL configuration for the second serving cell; and
   storing soft channel bits for received transport blocks (TBs) based on the maximum number of DL HARQ processes,
   wherein the DL reference UL/DL configuration for the second serving cell is one of 0, 1, 2, 3, 4, 5, and 6, and
   wherein the maximum number of DL HARQ processes is 16 when the DL reference UL/DL configuration for the second serving cell is 5, and the maximum number of DL HARQ processes is 12 when the DL reference UL/DL configuration for the second serving cell is 6.

2. The method of claim 1, wherein the soft channel bits are calculated by the following equation:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right)$$

where $N'_{soft}$ denotes a total number of soft channel bits of the UE, C denotes the number of code blocks forming a single TB, $N_{cb}$ denotes a soft buffer size of a code block, $K_{MIMO}$ is 2 when the UE corresponds to a MIMO Transport Mode™, $K_{MIMO}$ is 1 when the UE does not correspond to a MIMO TM, $M_{limit}$ is 8, $N^{DL}_{cells}$ denotes the number of serving cells configured for the UE, and $M_{DL\_HARQ}$ denotes the maximum number of DL HARQ processes.

3. The method of claim 1,
   wherein the maximum number of DL HARQ processes is 10 when the DL reference UL/DL configuration for the second serving cell is 0,
   wherein the maximum number of DL HARQ processes is 11 when the DL reference UL/DL configuration for the second serving cell is 1,
   wherein the maximum number of DL HARQ processes is 12 when the DL reference UL/DL configuration for the second serving cell is 2, and
   wherein the maximum number of DL HARQ processes is 15 when the DL reference UL/DL configuration for the second serving cell is 3, and wherein the maximum number of DL HARQ processes is 16 when DL reference UL/DL configuration for the second serving cell is 4.

4. The method of claim 1, wherein a number of the TBs is determined based on a minimum value between the maximum number of DL HARQ processes and a reference value.

5. The method of claim 4, wherein the reference value is more than 8.

6. A method of performing a Hybrid Automatic Repeat reQuest (HARQ) operation by a user equipment (UE), the method comprising:
   establishing a Radio Resource Control (RRC) connection with a base station through a first serving cell or a second serving cell, the second serving cell supporting a Frequency Division Duplex (FDD) mode, the first serving cell supporting a Time Division Duplex (TDD) mode;
   receiving an RRC message from the base station through the first serving cell or the second serving cell, the RRC message comprising carrier aggregation (CA) configuration information, the CA configuration information comprising information of the first serving cell and the second serving cell being aggregated by a TDD-FDD CA scheme; and when the first serving cell is a secondary serving cell (SCell) associated with the second serving cell through the TDD-FDD CA scheme, executing, by the UE, a process comprising:
setting, based on the determined FDD-TDD CA scheme, a first maximum number of DL HARQ processes for the first serving cell as 8; and
storing soft channel bits for received transport blocks (TBs) based on the first maximum number of DL HARQ processes for the first serving cell set as 8; and when the second serving cell is a secondary serving cell (SCell) associated with the first serving cell through the TDD-FDD CA scheme, executing, by the UE, a process comprising:
determining a second maximum number of DL HARQ processes for the second serving cell based on an uplink(UL)/downlink(DL) configuration of the first serving cell, wherein the UL/DL configuration is a DL reference UL/DL configuration for the second serving cell; and
storing soft channel bits for received transport blocks (TBs) based on the second maximum number of DL HARQ processes,
wherein the DL reference UL/DL configuration for the second serving cell is one of 0, 1, 2, 3, 4, 5, and 6, and
wherein the second maximum number of DL HARQ processes is 16 when the DL reference UL/DL configuration for the second serving cell is 5, and the second maximum number of DL HARQ processes is 12 when the DL reference UL/DL configuration for the second serving cell is 6.

7. The method of claim 6, wherein the TDD-FDD CA scheme configures the first serving cell as a Primary serving cell (PCell), configures the second serving cell as the secondary serving cell (SCell), and configures a self-scheduling for the UE.

8. A method of performing a Hybrid Automatic Repeat reQuest (HARQ) operation by a user equipment (UE), the method comprising:
establishing a Radio Resource Control (RRC) connection with a base station through a first serving cell or a second serving cell, the second serving cell supporting a Frequency Division Duplex (FDD) mode, the first serving cell supporting a Time Division Duplex (TDD) mode;
receiving an RRC message from the base station through the first serving cell or the second serving cell, the RRC message comprising carrier aggregation (CA) configuration information, the CA configuration information comprising information of the first serving cell and the second serving cell being aggregated by a TDD-FDD CA scheme; and
when the second serving cell is a secondary serving cell (SCell) associated with the first serving cell through the TDD-FDD CA scheme, executing, by the UE, a process comprising:
determining a maximum number of DL HARQ processes for the second serving cell based on an uplink(UL)/downlink(DL) configuration of the first serving cell, wherein the UL/DL configuration is a DL reference UL/DL configuration for the second serving cell,
wherein the maximum number of DL HARQ processes is determined based on the following Table

TABLE

| DL-reference UL/DL Configuration | Maximum number of HARQ processes |
|---|---|
| 0 | 10 |
| 1 | 11 |
| 2 | 12 |
| 3 | 15 |
| 4 | 16 |
| 5 | 16 |
| 6 | 12. |

9. The method of claim 8, the process further comprising:
storing soft channel bits for received transport blocks (TBs) based on the maximum number of DL HARQ processes.

10. The method of claim 9, wherein a number of the TBs is determined based on a minimum value between the maximum number of DL HARQ processes and a reference value, wherein the reference value is more than 8.

* * * * *